(12) United States Patent
Wright et al.

(10) Patent No.: US 11,893,009 B2
(45) Date of Patent: Feb. 6, 2024

(54) BLOCKCHAIN DATABASE MANAGEMENT SYSTEM

(71) Applicant: nChain Licensing AG, Zug (CH)

(72) Inventors: Craig Steven Wright, London (GB); Brock Gilles Doiron, London (GB)

(73) Assignee: nChain Licensing AG, Zug (CH)

( * ) Notice: Subject to any disclaimer, the term of this patent is extended or adjusted under 35 U.S.C. 154(b) by 79 days.

(21) Appl. No.: 17/636,340

(22) PCT Filed: Aug. 18, 2020

(86) PCT No.: PCT/IB2020/057762
§ 371 (c)(1),
(2) Date: Feb. 17, 2022

(87) PCT Pub. No.: WO2021/033134
PCT Pub. Date: Feb. 25, 2021

(65) Prior Publication Data
US 2022/0300487 A1    Sep. 22, 2022

(30) Foreign Application Priority Data

Aug. 22, 2019 (GB) ...................................... 1912068

(51) Int. Cl.
*G06F 16/23* (2019.01)
*G06F 16/27* (2019.01)
(52) U.S. Cl.
CPC .......... *G06F 16/2379* (2019.01); *G06F 16/27* (2019.01)
(58) Field of Classification Search
CPC ................................................ G06F 16/2379
(Continued)

(56) References Cited

U.S. PATENT DOCUMENTS

| 6,115,715 A * | 9/2000 | Traversat ................ G06F 9/466 717/121 |
| 8,260,758 B2 * | 9/2012 | Rajakumar ............. G06F 9/526 707/696 |

(Continued)

FOREIGN PATENT DOCUMENTS

WO    2017145019 A1    8/2017

OTHER PUBLICATIONS

Satoshi et al., "Connection Limits," Bitcoin Forum, Aug. 9, 2010, https://bitcointalk.org/index.php?topic=741.0; prev_next=prev, 2 pages.
(Continued)

*Primary Examiner* — Muluemebet Gurmu
(74) *Attorney, Agent, or Firm* — Davis Wright Tremaine LLP

(57) ABSTRACT

In one aspect, the present disclosure proposes methods, devices and systems and devices for providing a new structured data pertaining to blockchain transactions to implement a new data structure. This new data structure is provided to implement a distributed database. In another aspect, a new distributed data management system (DBMS) is provided, that can manage data associated with the new data structure. However, unlike a conventional DBMS for traditional databases, the present disclosure provides a blockchain DBMS that is configured to managed data associated with one or more blockchain transactions, said data being stored in the new data structure. In another aspect, the present disclosure provides a method for generating or providing one or more blockchain transactions for implementing one or more standard database commands that are received for accessing or manipulating a database, where the data is stored on the new data structure.

11 Claims, 11 Drawing Sheets

(58) Field of Classification Search
USPC .......................................................... 707/703
See application file for complete search history.

(56) References Cited

U.S. PATENT DOCUMENTS

| | | | |
|---|---|---|---|
| 2010/0235335 A1* | 9/2010 | Heman | G06F 16/2246 |
| | | | 707/703 |
| 2016/0378820 A1* | 12/2016 | Marcotte | G06F 16/1734 |
| | | | 707/703 |
| 2019/0236559 A1 | 8/2019 | Padmanabhan | |
| 2023/0205759 A1* | 6/2023 | Gordon | G06F 16/2322 |
| | | | 707/703 |

OTHER PUBLICATIONS

Antonopoulos, "Mastering Bitcoin—Unlocking Digital Cryptocurrencies," O'Reilly Media, Inc., Dec. 20, 2014, 282 pages.
Nakamoto, "Bitcoin: A Peer-to-Peer Electronic Cash System," Bitcoin, Oct. 31, 2008, https://bitcoin.org/bitcoin.pdf, 9 pages.
International Search Report and Written Opinion dated Dec. 2, 2020, Patent Application No. PCT/IB2020/057762, 19 pages.
UK IPO Search Report dated Feb. 11, 2020, Patent Application No. GB1912068.2, 6 pages.

* cited by examiner

First Transaction
1. Create database (TxID 1)

Second Transaction
2. Create transaction (TxID 2)

Third Transaction
3. Update database transaction
(TxID 1 →  TxID 3)

Fourth Transaction
4. Create entry transaction (TxID 4)

Fifth Transaction
5. Update table transaction (TxID 2 → TxID 5)

Sixth Transaction
6. Update database transaction (TxID 3 → TxID 6)

Seventh Transaction
7. Update entry transaction (TxID 4 → TxID 7)

Eighth Transaction
8. Update table transaction (TxID 5 → TxID 8)

Ninth Transaction
9. Update database transaction (TxID 6 → TxID 9)

Tenth Transaction
10. Update entry transaction (TxID 8 → TxID 10)

Eleventh Transaction
11. Update table transaction (TxID 9 → TxID 11)

BLOCKCHAIN DATABASE MANAGEMENT SYSTEM

CROSS-REFERENCE TO RELATED APPLICATION

This application is a 371 National Stage Patent Application of International Patent Application No. PCT/IB2020/057762, filed on Aug. 18, 2020, which claims priority to United Kingdom Patent Application No. 1912068.2, filed Aug. 22, 2019, the disclosures of which are incorporated herein by reference in their entirety.

TECHNICAL FIELD

This disclosure relates generally to methods and systems for implementing a database and/or a database management system for data pertaining to transactions associated with a distributed ledger. The disclosure is particularly suited but not limited to applications where existing databases are to be migrated to or be implemented in association with a distributed ledger, i.e., where data for the database is associated with transactions pertaining to the distributed ledger after such migration.

BACKGROUND

In this document we use the term 'blockchain' to include all forms of electronic, computer-based, distributed ledgers. These include consensus-based blockchain and transaction-chain technologies, permissioned and un-permissioned ledgers, shared ledgers, public and private blockchains, and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain, and alternative blockchain implementations and protocols associated with any kind of digital asset or a representation of a digital asset fall within the scope of the present disclosure. The terms "user," "sender," "recipient" may refer herein to a computing or processor-based resource. The term "Bitcoin" is used herein to include any version or variation that derives from or is based on the Bitcoin protocol. The term "digital asset" may refer to any transferrable asset such as cryptocurrency, tokens representing at least a part of a property, a smart contract, a license, i.e. software license, or DRM contracts for media content, etc. It will be understood that the term digital asset is used throughout this document to represent a commodity that may be associated with value that may be transferred to or provided as a payment in a transaction from one entity to another.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid, and the transaction is then written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Once stored in the blockchain as a UTXO, a user can transfer control of the associated resource to another address associated with an input in another transaction. This transfer is usually done using a digital wallet. This digital wallet may be a device, physical medium, program, application (app) on a computing device such as a desktop, laptop or a mobile terminal, or a remotely hosted service associated with a domain on a network work, such as the Internet. The digital wallet stores public and private keys and can be used to track ownership of resources, tokens and assets etc. associated with a user, receive or spend digital assets, transfer tokens which may relate to digital assets such as cryptocurrencies, or licenses, or property or other types of resource.

Although blockchain technology is most widely known for the use in relation to digital assets, i.e. cryptocurrency implementation or tokens, digital entrepreneurs have begun exploring the use of both the cryptographic security system it is based on and the other types of data that can be stored on the Blockchain to implement new systems. It would be highly advantageous if the blockchain could be used for automated tasks and processes which are not limited to the realm of digital assets. Such solutions would be able to harness the benefits of the blockchain (e.g., a permanent, tamper-proof record of events, distributed processing, etc.) while being more versatile in their applications. Thus, public blockchains serve as an immutable distributed data storage system that leverages both cryptography and economic incentives for security.

However, such security elements are not always present in databases, such as distributed databases and/or private and/or enterprise databases. A database where portions of the data are stored in several different physical locations and computational power is distributed among the associated nodes is referred to as a distributed database. This therefore leaves such distributed databases vulnerable to attack. Security features are important to many enterprises that use distributed databases, and this may be managed by a Distributed database management system (a distributed DBMS or DDBMS). A DDBMS is a computer software system that integrates the distributed data so it can be managed as if it was stored in a single server or computing resource and provides a systematic means to update and query data in the distributed database.

There are many parallels that can be drawn between blockchains and distributed databases, such as having a decentralized storage of information across a network to prevent having a single point of failure. The advantages of blockchain stem from the underlying data structure, where cryptographic hash functions are used to link data leading to an immutable record of all valid actions since its inception.

This is a vital feature for transparency and auditing that private or existing databases cannot provide. However, even so there does not exist a simple technique to migrate current distributed databases and DDBMS systems to be incorporated in association with a distributed ledger, i.e. in a blockchain. Many proposed blockchain solutions that purport to manage data do not offer interoperability with current distributed databases, which is a technical deterrent for an enterprise to change to more secure blockchain based implementations to manage and store data. From a commercial perspective, such interoperability involves a larger investment from enterprises and may leave them resistant to the change.

The present disclosure addresses these technical concerns by proposing techniques by which existing and common database features, such as those already used in existing (distributed) databases, can be used for implementing a distributed database on or using a distributed ledger, i.e., a blockchain. The present disclosure therefore provides aspects and embodiments for implementing a new data structure that is compatible with an existing database and its features as well as the blockchain, thereby ensuring interoperability and scalability, and availing the additional security provided by the blockchain implementation. The present disclosure also provides a DBMS associated with the blockchain for managing this new data structure. The present disclosure thereby enables a means for achieving interoperability with existing non-blockchain databases, which is important to the gradual conversion of current (private enterprise or other) database systems to a more secure and robust equivalent blockchain system.

SUMMARY

In one aspect, the present disclosure proposes methods, devices and systems for providing a new structured data storage technique pertaining to blockchain transactions to implement a new data structure. This new data structure is provided to implement a distributed database. In another aspect, a new distributed data management system (DBMS) is provided, that can manage data associated with the new data structure. However, unlike a conventional DBMS for traditional databases, the present disclosure provides a blockchain DBMS that is configured to manage data associated with one or more blockchain transactions.

In another aspect, the present disclosure provides a method for generating or providing one or more blockchain transactions for implementing one or more standard database commands that are received for accessing or manipulating a database, where the data is stored on the new data structure.

Thus, aspects and embodiments of the present disclosure proposes a system wherein existing and known (common) database feature can be provided through structuring data within a distributed ledger, i.e. blockchain, using the proposed data structure, and wherein the proposed DBMS provided for managing the proposed data structure is configured to interpret and process standard database commands (such as standard structured query language (SQL) commands) using the blockchain for accessing and managing the data associated with the data structure.

Throughout this specification the word "comprise" or variations such as "includes" "comprises" or "comprising" will be understood to imply the inclusion of a stated element, integer or step, or group of elements, integers or steps, but not the exclusion of any other element, integer or step, or group of elements, integers or steps.

BRIEF DESCRIPTION OF THE DRAWINGS

Aspects and embodiments of the present disclosure will now be described, by way of example only, and with reference to the accompany drawings, in which.

DETAILED DESCRIPTION

Figure 1:
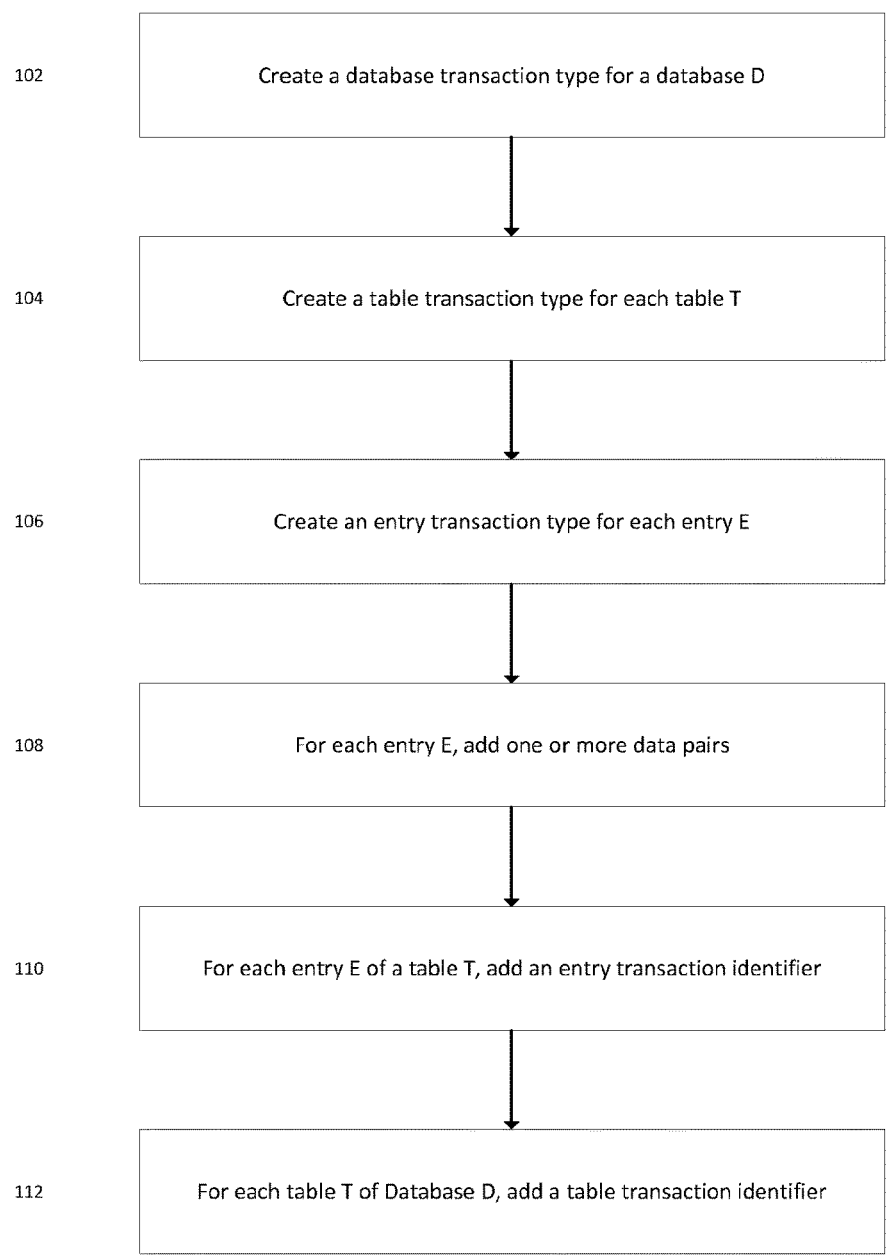
FIG. 1 is a flow diagram depicting a method providing a data structure for storing and/or managing data associated with transactions pertaining to a distributed ledger according to a first aspect, the method implemented by one or more processors of associated with a data management system (DBMS).

In accordance with a first aspect, the present disclosure provides a computer implemented method for providing a data structure for storing and/or managing data associated with one or more transactions pertaining to a distributed ledger. This method is implemented by one or more processors associated with a database management system (DBMS) for the distributed ledger and comprises creating a database transaction type that comprises:

an identifier for a database D that is to be used to obtain data for one or more transactions pertaining to a distributed ledger; and one or more table transaction identifiers (TTxID), wherein a given TTxID among the one or more TTxIDs is specific to a given table among one or more tables associated with the identified database D, wherein the given TTxID relates to a transaction pertaining to a distributed ledger for the given table.

The method also includes creating a table transaction type that comprises:

an identifier for a table T, the table being among the one more tables associated with the identified database D; and one or more entries associated with the identified table T.

There are many parallels that can be drawn between distributed ledgers, i.e. blockchains, and distributed databases, such as having a decentralized storage of information across a network to prevent having a single point of failure. The advantages of the blockchain stem from the underlying data structure, i.e. where each block contains a hash of the previous block that blocks become chained together and for instance where cryptographic hash functions are used to link data leading to an immutable record of all valid actions since its inception. This structure for data in a blockchain is a vital feature for the advantages of transparency and auditing that existing databases cannot provide. Advantageously, the method according to the first aspect provides a technique for providing a data structure that is based on data types associated with one or more transactions associated with a distributed ledger, i.e. the database data type and the table data type and set out above, with identifies transactions representing tables with its associated entries. The data structure of the first aspect is herein after referred to as a blockchain (based) data structure for ease of reference, as is one that enables common database features to be provided and implemented through structuring and managing of data within the blockchain. For instance, common database features that are used in existing databases may be based on the arrangement of data in a table with entries that can be identified by a row in a given table, which are then manipulated by common database commands, such as using Structured Query Language (SQL) commands. By implementing a data structure for where data associated with one or more blockchain transactions can be also stored and manipulated using these same common features, the first aspect of the present disclosure enables interoperability with existing data bases and/or distributed databases, there making a conversion or transition process to using a blockchain in place of the existing database easy, scalable, seamless, simple, fully transparent, traceable and efficient. Thus, the blockchain data structure proposed in the first aspect is able to provide a structured storage for an entire database based on blockchain transaction identifiers (TTxID) associated with a given transaction.

In some embodiments, the table transaction type of the first aspect includes one or more entry transaction identifiers (ETxID), wherein a given ETxID among the one or more ETxIDs is specific to a given entry E among one or more entries associated with the identified table T, and wherein the given ETxID relates to a transaction pertaining to the distributed ledger for the given entry E. The method also includes creating an entry transaction type comprising one or more data pairs, wherein each data pair relates to an entry in the identified table T, and wherein each data pair comprises a reference R identifying a position in the identified table, and a value VL for the identified position.

In addition to the above-mentioned advantages of the first aspect, the above embodiment defines an entry data type for storing transaction identifiers of blockchain transactions associated with an entry E, which is in turn associated with a table T of a given database D. Accordingly, any changes to an entry can be implemented by a transaction that spends the latest transaction (identified by the ETxID in the entry data type), where the new transaction contains the updated data. To be consistent, each dependent transaction would also have to be updated to reflect the latest transaction identifier TxID (which can be an ETxID referring to an entry transaction or a TTxID referring to a table transaction). That is, if values of an entry E are updated, the entry transaction identifier ETxID in the table transaction would also have to be updated, and then consequently the table transaction identifier TTXID in the database transaction that refer to updated entry E would have to be updated.

This advantageously provides a nested data structure according to the first aspect, where any change to an entry E requires an update to the entry data type with a new ETxID, an update to the table such that the TTxID associated with the entry E includes the new ETxID, and an update to the database D with the updated TTxID, allows for a robust, immutable and fully auditable record of changes to the database and its present state, as data from the data structure cannot simply be removed or modified (without modifying the entire chain of transactions that are associated with a given entry E). Furthermore, advantageously with such nested data structure one would only have to monitor transactions associated with the database (identified by the database name D or a table T) to be able to reconstruct or query the data. This is similar to storing a compressed form of the database in place of the full record of the database.

In some embodiments, instead of an entry data type, it is possible for the data references and/or values to be stored straightaway in the table T, i.e., included in the table transaction type itself. This will mean that the data can be identified based on the table transactions (TTxIDs) in the database transaction data type. However, for ease of reference and consistency, the nested data structure where both ETxIDs as well as TTxIDs are stored is hereinafter referred to, but the present disclosure is not so limited.

In some embodiments, the transaction relating to the one or more TTxIDs or ETxIDs are associated with one or more unspent transaction outputs (UTXOs). In some embodiments, the UXTO for the given transaction includes an output script that is spendable by a subsequent transaction associated with the identified database D and/or table T. In some embodiments, the UTXO for the given transaction includes a non-spendable output that is associated with the spendable output script for the given transaction.

Advantageously, including a non-spendable output, for example an OP_RETURN script, is used to signify a valid transaction that relates to performing one or more database operations. This enables the operable or spendable UTXO that is related to the OP-RETURN that includes the latest update to the database D or table T or entry E to be readily and easily identified when in the distributed ledger, i.e. blockchain, by one or more processors associated with a client entity for a user interacting with the database. A further advantage is that provision of a non-spendable output identifies the transaction identifier (TTxID or ETxID) used for the latest database operation or update. The client entity can simply query the blockchain or the distributed ledger to identify the non-spendable OP_RETURN transaction(s) associated with the database D, from which a spendable payload or UTXO can be obtained. Once UTXOs for the recipient are identified, they can then be processed by executing the spendable output scripts The first aspect of the present disclosure also relates to a data structure or a nested data structure for storing and/or managing data associated with one or more transactions pertaining to a distributed ledger, the data structure being managed by one or more processors associated a data management system (DBMS) for the distributed ledger, the data structure including a data transaction type, a table transaction type and an entry transaction type as set out above in relation to the first aspect. In some embodiments, the data structure is a nested transaction storage structure configured to store the entire identified database D based on storing TTxIDs, and in some embodiments ETxIDs, associated with the identified database D, as discussed above.

Some embodiments of the present disclosure relate to methods for performing one or more database requests by implementing transactions associated with a distributed ledger, the transactions using the blockchain based data structure as set out above. The method is implemented by one or more processors associated with a database management system (DBMS), and is related to generating one or more transactions pertaining to the distributed ledger for performing one or more of: creating, updating or modifying/deleting one or more of the database transaction type, table transaction type or entry transaction type. The method also includes providing one or more outputs based on the created transaction associated with the distributed ledger. In some embodiments, the outputs are spendable and/or non-spendable output scripts as discussed above. In some embodiments, the generation of the one or more transaction is based on processing or spending a previous transaction associated with the database or table or entry. The method also includes updating one or more of the datatypes set out above based on the outputs of the previous transaction. The sequence of the steps of generating transactions, providing outputs and updating the datatypes in order implement one or more database requests are explained in detailed with respect to the figures below.

Related to and complementary to the above discussed embodiments, related embodiments when implemented by one or more processors associated with a client entity for implementing one or more requests associated with a database include the steps of sending a request relating to one or more of: creating, updating or modifying or deleting one or more of the database transaction type, table transaction type or entry transaction type; and monitoring the distributed ledger for at least one transaction output associated with a transaction that has been generated by the DBMS related to the respective request.

Advantageously, the above embodiments provide a method of using standard or known database commands and functions, such as standard structured query language (SQL) to manipulate the data structure of the first aspect that is associated with the distributed ledger and includes transaction identifiers associated with those of the distributed ledger. Advantageously, by enabling the use standard SQL commands for use with the blockchain implemented data structure, a user or client entity associated with a given user would detect no change before, during and after migration of an existing database to a blockchain-based implementation of the database. This seamlessness is important for the gradual conversion of enterprise systems to a more secure and robust equivalent blockchain system for a database. For easier adoption and interoperability with current database systems, the above embodiments enable standard SQL commands to be applied to the blockchain based data structure of the first aspect using one or more consecutive blockchain transactions. Although a selection of SQL commands is discussed herein in this disclosure, similar methods can be applied to map an entire standard SQL library to the blockchain based data structure of the first aspect.

A second aspect of the present disclosure relates to a computer implemented method for managing access to a data management system (DBMS), the DBMS managing data pertaining to transactions associated with a distributed ledger, the data being provided in a database. In some embodiments, the database is implemented using the data structure explained above. The method when implemented by one or more processors associated with a database includes comprising the step of: responsive to a request for registration with the DBMS, creating a record associated with a given user, the record including an identifier for the given user among a plurality of users. The method includes, obtaining a public key P associated with the given user; the public key being part of a cryptographic key pair associated with the given user, the cryptographic key pair including a private key V for the given user. The method then includes obtaining or assigning one or more attributes associated with the given user, wherein each attribute is associated with a setting relating to access to a database managed by the DBMS. In some embodiments, the setting for a given attribute confirms if the given attribute is associated with permission to perform one or more of a read, write/update, modify or delete operation associated with the database. This may be referred to as a permission setting. The method also includes the step of updating the record based on the obtained public key P, as well as one or more attributes associated with the given user; and storing or providing the updated record in association with the DBMS.

Thus, the second aspect of the present disclosure relates to a management system to facilitate requests relating to the blockchain based data structure of the first aspect. For instance, a data management system (DBMS) may be needed to help access the data in the data structure, construct and/or submit transactions to the distributed ledger for the data structure, as well as keep record of the relevant transaction IDs (TxIDs, which may be TTxIDs or ETxIDs). This data management is analogous to the standard database management system (DBMS) or a distributed DBMS (DDMS) of conventional distributed databases, which serves to integrate distributed data systems, and may a third-party service that can be implemented by a remote server, or one or more distributed processors that implement a single server functionality, or may even be client side implementation, i.e. computing entities for a client entity or organisation that has enough resources to manage their own DBMS.

Advantageously, the method for managing access to a data management system of the second aspect protects the integrity of the blockchain implemented database of the first aspect and provide security by serving as an identity verification resource. The second aspect provides for multi-level permission control such as read-only, write-only (update, modify or delete data), or both read and write privileges based on the attributes that are associated with each user that registers with the DBMS. The use of cryptographic keys associated with a client entity for a given user in the user record created improves security of the DBMS, which can be implemented off-chain as set out above. Although this is discussed herein as an off-chain implementation, i.e. not implemented on or using the distributed ledger itself, the present disclosure also relates to on-chain implementations using known methods including: certificate authorities for public key infrastructure (PKI), session keys derived from an initial shared secret, or a standard username/password authentication system encrypted within a transaction. In some embodiments, the method of the second aspect may be implemented by a system administrator component or resource responsible for DBMS registration and key distribution, along with a record of access attributes that can be used to write to or read from the database. In some embodiments, the user records may be stored off-chain as a local file in the forms of objects (to be used as such when manipulated using object-oriented programming languages, for instance), or encrypted on the blockchain with a reference to the TTxID or ETxID.

In some embodiments, the attributes may refer to a team or category that the user is associated with For example, in an organisation structure an attribute could be the name of the department. Thus, a user with the department attribute being "Human Resources" (HR) in the registered user record may have a setting with valid permissions (permission settings or access attributed settings) to access a database or a table relating to "people management", but will not have a valid setting to access a database or table associated with the accounting department. Sub-categories of attributes for different users may also have different settings. For example, a user record who has a HR Director status in the HR department may have full access (read and write) to the HR databases, but only a "read" access to some accounting databases such as payroll. Another user in the same HR department with a HR assistant status may not have any valid permission setting for the payroll databases and may only have read accesses to the HR databases as well.

In some embodiments, the setting(s) for each attribute may also be provided in the request for registration received from the given user (or the client entity associated with the given user), or the setting is obtained from a computing resource associated with the DBMS, or the setting is predetermined for each attribute by a system administrator or an equivalent computing resource for the database managed by the DBMS.

In some embodiments relating to the second aspect, the present disclosure also provides a computer implemented method for implementing a DBMS for accessing a database, the method comprising the steps of obtaining a request for an operation associated with the database from a client entity, the client entity associated with a given user among a plurality of users, wherein the request includes a digital signature associated with the given user. In some embodiments, the request is a request to read, write, modify or delete data in the database. In some embodiments the database is implemented using the data structure of the first aspect and embodiments explained above. The method also includes determining that the given user is authorised to access the database. Responsive to successful determination, the method includes verifying that the digital signature is associated with the given user based on a user record associated with the DBMS. In some embodiments, the user record is created upon registration with the DBMS as discussed above. Responsive to successful verification, the method includes generating a message based on a current instance of the user record and the request.

Advantageously, once a user is registered as discussed above based on the information in a user record that has been created during registration, the second aspect of the present disclosure provides a method of implementing a DBMS for processing user requests associated with the blockchain data structure of the first aspect, so as to provide a single point of reference for the distributed data and to verify that a given user has the permission, i.e. a valid setting. to perform the request.

In some embodiments, the step of determining that the user is authorised includes determining that a user record associated with the DBMS is present for the given user upon registration of with the DBMS. In some embodiments, the step of verifying the digital signature is based on determining that the private key V or a signing key K used to sign the request is associated with the public key P associated with the given user in the user record. This advantageously increases the security of the DBMS at the time of making a request for database access, as two checks are carried out before a given user or the client entity associated with the given user can have any access to the data in the database. Firstly, if the request is from an unregistered user, it is straightaway rejected as there will be no associated user record to verify the requesting user's permissions for access. Secondly, the identity of the user making the request is checked by verifying that the digital signature in the request is actually associated with a public key P that is linked to the user record, such that the signature can be verified using this public key P. If a malign user sends a request, then the public key P held with the user record will not be able to verify the digital signature (which is in turn based on the private key V of the same user).

In some embodiments, responsive to the authorisation being unsuccessful the method includes generating an error notification to specify that the given user is not authorised or is not registered to access the database. Also, responsive to the verification of the digital signature being unsuccessful, the method generating an error notification to specify that the signature applied to the request is not valid for the given user.

When implemented by one or more processors associated with a client entity, the second aspect of the present disclosure also provides a method for registering with the DBMS comprising the steps of: generating a request for registering with the DBMS, the request associated with the given user, providing or accessing one or more attributes associated with the given user, each attribute associated with a setting relating to the database managed by the DBMS. The method also includes generating a private key V associated with the given user, the private key being part of a cryptographic key pair that includes a public key P for the given user, and calculating the public key P based on the private key V. In some embodiments, the private key may be generated using one or more known means, i.e. it may be based on a secret seed or random number generator as a starting point or may be based on a network identifier of the client entity associated with the given user. This key V is kept secret, but is used to generate the public key P in such a way that any message encrypted or signed with the private key V can only be validated or read or decrypted with the public key P. The method also includes sending the public key P and the one or more attributes to the DBMS. Advantageously, this increases the security of the DBMS and increases the privacy of all requests for performing one or more operations associated with the blockchain implemented database.

The second aspect of the present disclosure also includes a method of accessing data associated with the database when implemented by one or more processors associated with a client entity. The method in this case comprises the steps of generating the above-mentioned request that is associated with a database operation, the request associated with the given user, and the database managed by the DBMS. The method includes generating a digital signature based on a private key V for the given user, the private key being part of a cryptographic key pair that includes a public key P for the given user, where the public key P being provided to the DBMS. The method then includes applying the digital signature to the request and sending the signed request to the DBMS. In some embodiments, the method includes the method of registering with the DBMS, as set out above.

In some embodiments, the method includes generating a signing key K based on the private key V, wherein the signing key is an ephemeral key. In some embodiments, the cryptographic keys, i.e. public and/or private and/or session key(s) for a given client entity are stable elliptic curve digital signature algorithm (ECDSA) keys. An ECDSA public key, for instance, will be a valid point on the secp256k1 curve, compressed, and hex encoded. In some embodiments the secure hash of a secret seed or a generator G associated with the client entity may be used to generate the private key V. G is typically a known constant that may in some embodiments be known or shared with one or more entities associated with the client entity for one or more blockchain transactions. In some embodiments, the public key P may be based on a network identifier associated with a public (network) address for the client entity and may include a secure hash value, i.e. based on a secure hash algorithm (SHA).

The digital signature associated with the private key V of the given user also advantageously provides an auditable record of the request submissions that can be verified with the user records, without a given user having to interact with the blockchain directly. A system administrator, i.e. a computing resource providing this functionality for the DBMS, in some embodiment may batch requests into one blockchain transaction. By including the signed request within an OP_RETURN, a clear audit trail is still provided, thereby increases transparency and accountability while providing interoperability with conventional systems, and while still maintaining an immutable record on the blockchain. The OP_RETURN payload can in some embodiments be encrypted using a deterministic derived key prior to transactions being constructed (if the request is a write request). In some embodiments, the attributes can also be appended along with a data reference or hash of a reference for easier retrieval, if need be.

In a third aspect, the present disclosure relates to a computer implemented method for implementing a database management system (DBMS) for managing a database pertaining to transactions associated with a distributed ledger, the method comprising the steps of: receiving a message associated with a current instance of a user record for a given user among one or more users, and a request associated with the database, the request being provided by the given user. The method includes the step of parsing the request associated with a database, which comprises the steps of retrieving one or more attributes associated with the given user from the current instance, and verifying that the setting for each of the retrieved attributes is valid for the request made by the given user. In some embodiments, said verifying includes checking that the setting for a given attribute among the one or more attributes indicates that the given user has permission to access to the database for the request made. Responsive to successful verification, the method includes performing one or more operations associated with the database based on the request, wherein the database is based on a data structure provided as discussed in the first aspect. The step of performing further includes, if the request is associated with a read operation, obtaining one or more transaction identifiers (TTxID, ETxID) related to the request, each obtained transaction identifier pertaining to a transaction, whereby the data for said transaction is associated with the data structure, and accessing the data relating to the obtained transaction identifier (TTxID, ETxID) from the data structure. If the request is associated with a write or modify or delete operation, then in addition to the step of obtaining, the method further includes generating one or more transactions for spending or processing the transaction(s) associated with the obtained one or more transaction identifiers (TTxID, ETxID) based on the operation, and also updating the data structure with identifiers relating to the generated transactions.

In addition to the advantages already discussed above for increasing security, reliability and privacy when registering and/or accessing the data in a blockchain based data structure of the first aspect, methods according to the third aspect advantageously provides a means for interpreting and processing standard database commands associated with the database i.e. the blockchain based data structure. Thus, advantageously the method according to the third aspect acts as an SQL compiler, but for a blockchain, i.e. implementing this functionality of interpreting, verifying and executing one or more SQL commands using the TTxIDs or the ETxIDs associated with the blockchain. In addition, the methods of the third aspect also performs execution of the attribute verification in the user record. Thus, assuming that user record for a given user does exist, it is then checked if the settings for the attributes for that user valid for the request made. In some embodiments, such verification is based on the methods and embodiments discussed in relation to the second aspect. For instance, following on from the above example of an organisation where attributes are departments or teams, if a registered user with an HR assistant attribute makes a write request to the HR or the payroll databases, this will be rejected. Whereas if a registered user with a HR director attribute makes a read request to the payroll databases, then this request is allowed to proceed further. If the appropriate settings, i.e. access permissions associated with one or more attributes, are valid, then the requests are executed by either obtaining the relevant transaction identifiers, or generating one or more blockchain transactions (based on spending the outputs of previous transactions by an authorised or registered user with necessary permissions), and providing output scripts with transaction identifiers TxIDs (which could be the new TTxIDs or ETxIDs) for the generated transactions, so that the database data type or table transaction type or entry transaction type may be updated with the new TxIDs.

If the request is associated with a read function, i.e. data access rather than manipulation, in some embodiments, this may be performed off-chain by the DDMS as there is no generating of a transaction required, and standard SQL protocols can be used for data access (following registration and/or access verification of the second aspect). This advantageously also allows the system to leverage standard efficiency optimization and scaling methods for easy interfacing with existing enterprise data management solutions.

In some embodiments, if the request is associated with a write, modify or delete operation, then the step of performing further includes the method of implementing one or more transactions as discussed above in relation to the first aspect, with respect to executing standard database SQL commands. In related embodiments, the step of generating further includes obtaining an output script associated with the obtained transaction identifier (TTxID, ETxID), and constructing a further transaction based on the output script. The further transaction may be based on or signed with a private key V associated with the client entity of the given user, the private key being part of a cryptographic key pair that includes a public key P for the given user. The method then includes providing the further transaction to the distributed ledger, the further transaction associated with a new transaction identifier (TTxID, ETxID).

Advantageously, the generation of a further transaction is only possible by a user that has the required attribute permission settings, and one that can be verified using the public key P in the respective user record. Thus, the previous transactions referred by the transaction identified in the most recent version of the datatypes in the blockchain implemented database can only be spent or accessed by users that are registered and verified, such that their identify is recorded or linked at each stage using the keys P and V. This ensures that there is a record of the user associated with the most recent transaction (even if this is encrypted), using these public cryptographic keys.

In embodiments where the request is associated with a write, modify or delete operation, the step of constructing the further transaction is performed by a Simplified Payment Verification (SPV) client associated with the DBMS, wherein the SPV client communicatively couples the DBMS to the distributed ledger via a communication network.

An SPV client is a computing resource that is associated with the DBMS and ensures that the DBMS of the second as well as third aspect connects to the blockchain (distributed ledger) via peer-to-peer connections to full nodes. However, an SPV does not mine or store a copy of the blockchain and therefore, such transactions can be verified and executed efficiently and with less complexity.

In embodiments where the request is associated with a write, modify or delete operation, each obtained transaction identifier (TTxID, ETxID) is associated with a transaction that includes a non-spendable UTXO, said non-spendable UTXO associated with or including a spendable payload, the spendable payload being a spendable UTXO. In some embodiments, each spendable and non-spendable UTXO is stored in a UTXO set or memory associated with the DBMS, wherein the non-spendable UTXO is an OP_RETURN output script, wherein one or more spendable UTXOs in the UTXO set or memory are used for constructing the further transaction.

Advantageously, to facilitate quick and simple access to the data, an indexed copy of the UTXO set or a subset containing the latest relevant transactions to the database may be provided in association with the DBMS of the third aspect. In some embodiments, this UTXO set may be integrated with the SPV wallet or node that tracks the cryptographic keys for the registered users associated with the DBMS to record updates (spending) of UTXO transactions. In some embodiments, a separate record of the indices is additionally or alternatively stored as a register of all transaction identifiers (TxIDs including the TTxIDs and ETxIDs in the data type of the data structure of the first aspect). Advantageously, this enables the OP_RETURN data to be more easily retrieved for queries. In some embodiments, the indices associated with these registers be a simple running integer count or more detailed data such as names, function output values or hash values.

Embodiments of the present disclosure include a computing device comprising a processor and memory, the memory including executable instructions that, as a result of execution by the processor, causes the device to perform the computer-implemented the above described embodiments of the first and second aspect that are to be implemented by a client entity.

Embodiments of the present disclosure include a DBMS system for managing access to data associated with one or more transactions pertaining to a distributed ledger, wherein the data managed by the DBMS is stored in a data structure as provided by the blockchain based data structure of the first aspect. The DBMS includes a registration and access management system having one or more processors configured to execute instructions that perform methods of the second aspect discussed above; a transaction execution system having one or more processors configured to execute instructions to perform methods of the third aspect discussed above. The DBMS also includes one or more registers for storing a plurality of transaction identifiers associated with the database and a UTXO set or a memory for storing a copy of a plurality of UTXOs associated with the database.

Embodiments of the present disclosure include a system comprising one or more computing devices, each being a client entity as set out above; a DBMS as set out above; and a communication network for communicatively coupling each client entity with the DBMS.

In some embodiments, a computer-readable storage medium is provided, having stored thereon executable instructions that, as a result of being executed by a processor of a computer system, cause the computer system to perform the method of the aspects and/or the embodiments discussed above.

Some specific embodiments are now described by way of illustration with reference to the accompanying drawings, in which like reference numerals refer to like features.

First Aspect—Blockchain Implemented Data Structure

FIG. 1 is a flowchart depicting a method that is concerned with providing a blockchain based data structure. In other words, this Figure depicts a method for providing a data structure that is associated with one or more transactions that is associated with a distributed ledger, i.e. a blockchain, according to a first aspect. In the embodiment seen in FIG. 1, a nested data structure is provided according to an embodiment of the first aspect, which includes database transaction data types, table transaction data types as well as entry data types. However, it will be understood that the entry transaction identifiers (ETxIDs) and the entry data transaction types are not essential for all embodiments of the first aspect, as it is possible for the end data or values and/or references to be provided in the table transaction data type itself in some embodiments. For ease of understanding and consistency however, throughout the description and the accompanying figures, the nested data type will be discussed hereinafter.

To facilitate the database functionalities, the data being stored must be structured consistently to be able to provide expected management and access that conventional databases provide. The most well-known example in conventional databases is the Structured Query Language (SQL), which uses a standard library of functions to record, update, and query data in a relational database. To be able to provide SQL-integration for blockchain data, the present disclosure proposes an analogous structure for data contained within a blockchain transaction, and FIG. 1 depicts a method of providing or implementing such a data structure, also referred to herein as a blockchain database or blockchain implemented data structure. The steps of FIG. 1 are implemented by one or more processors associated with a database management system for creating and/or managing a data structure associated with the blockchain.

Step 102 depicts creating a database transaction type, said database transaction type includes an identifier for a database. This could be the name of a database, i.e. D or first database, that is to be used for storing or obtaining data for one or more transactions pertaining to a distributed ledger. The database D indicated in the database transaction type includes among one or more tables associated with database D. The created data transaction type is configured to store identifiers for transactions (TTxIDs) that associated with the one or more tables.

Step 104 depicts the step of creating a table transaction type, said table transaction type comprising an identifier for a table. This could be the name of the table, i.e. T or first table. The table T is one among the one of more tables associated with the identified database D in step 102. The table T indicated in the table transaction type includes one or more entries associated with table T. The created table transaction type is configured to store identifiers for transactions (ETxIDs) that associated with the one or more entries.

Step 106 depicts the step of creating an entry transaction type, said entry transaction type relating to an entry among the one or more entries in the table T in step 104, and in some embodiments comprising an identifier for the entry, i.e. a reference or entry name such as E or first entry. In some embodiments each entry relates to a row of table T. The created data transaction type is configured to store data associated with each of the one or more entries.

Step 108 depicts the steps of providing one or more data pairs in the entry transaction type of step 106. Each data pair relates to an entry E in the identified table T, and wherein each data pair comprises a reference R identifying a position in the identified table, and a value VL for the identified position. In some embodiments R may indicate a row number, this being the position indicated in the table T, i.e. the $1^{st}$ row or the $9^{th}$ row etc. The remaining elements in each row may then include the value, i.e. VL, of the indicated row.

Step 110 depicts the step of providing one or more entry transaction identifiers (ETxID) in the table transaction type of step 104. A given ETxID is among one or more ETxIDs being specific to a given entry among the one or more entries associated with the table T. The given ETxID relates to a transaction pertaining to the distributed ledger for the given entry E in the given table T in step 104, which is in turn in the database D in step 102. In other words, ETxID referred to as an entry transaction identifier as it pertains to data relating to the given entry E of the table T.

Step 112 depicts the step of providing one or more table transaction identifiers (TTxID) in the database transaction type of step 102. A given TTxID is among one or more TTxIDs is specific to a given table that is among one or more tables associated with database D in step 102. This given TTxID relates to a transaction pertaining to a distributed ledger for the given table T, and is in other words referred to as a table transaction identifier as it pertains to data relating to a table in database D.

Figure 2:
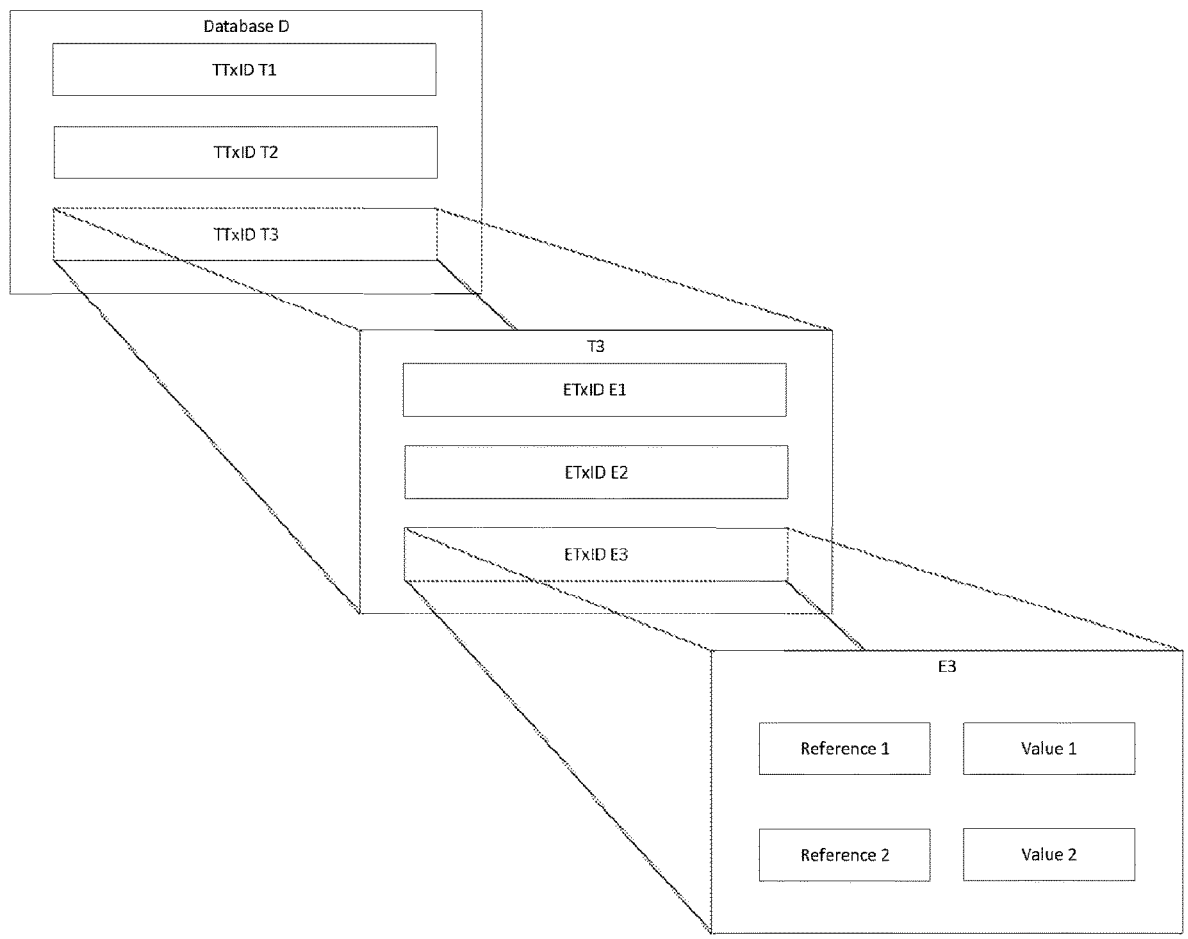
FIG. 2 is a schematic diagram depicting a data structure according to the first aspect for storing and/or data associated with transactions pertaining to a distributed ledger.

A nested blockchain based data structure according to the first aspect showing the transaction datatypes associated with the blockchain and their interrelationship is seen in FIG. 2. The database transaction datatype contains the name of the database (D) that can be used for searching or querying the data structure. It also contains the TTxIDs of all constituent tables. For each table, T1, T2, T3 etc., the TTxIDs are stored herein. The table transaction datatype begins with the name of the table (T1, T2 T3) and is populated with the ETxIDs referencing the entry data E1, E2, E3 etc. for each table. This is shown for T3 in the figure. The entry transaction data type includes references and associated data values, each representing a row in a table T1, T2 or T3. The reference and value pairs for entry E3 in table T3 are shown in FIG. 2.

First Aspect—SQL Commands for Use in the Blockchain Data Structure

Structured query language (typically abbreviated as SQL) is a common programming language that allows users to efficiently manage and query a relational database, i.e. where there is a structured relationship between the data elements. The code is passed to a database management system (DBMS) that complies and processes the request locally or remotely in the case of a distributed database. There are in general four main categories of SQL code
1. Data queries using SELECT function and condition statements (FROM, WHERE),
2. Data manipulation using INSERT, DELETE, and UPDATE,
3. Data definition using CREATE,
4. Data control for permissioned access such as GRANT or REVOKE.

Having structured data, such as found in an SQL relational database, makes data retrieval efficient. A considerable amount of work has been put in by developers in the past to optimize the process of querying data based on the underlying structure of the data. Most commercial database systems have a dedicated query optimizer and a query execution engine. The execution engine determines the operations (such as sort, scan and merge) to be applied to the data. The query optimizer then creates the plan (logical flow) of execution to perform the search most efficiently depending on the structure of the data and computational cost. Ultimately, the query is performed by the query execution engine according to the plan.

Figure 3A:
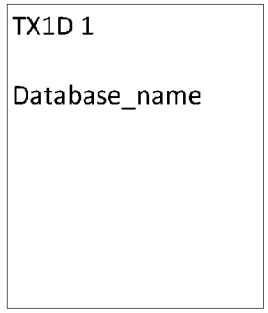
FIGS. 3a to 3c are schematic diagrams depicting transactions for managing data using a data structure in accordance with the first aspect.
Figure 3A:
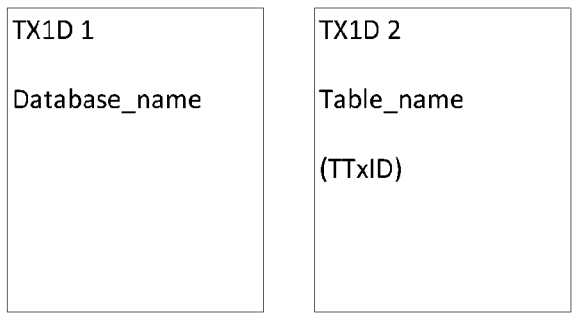
Figure 3A:
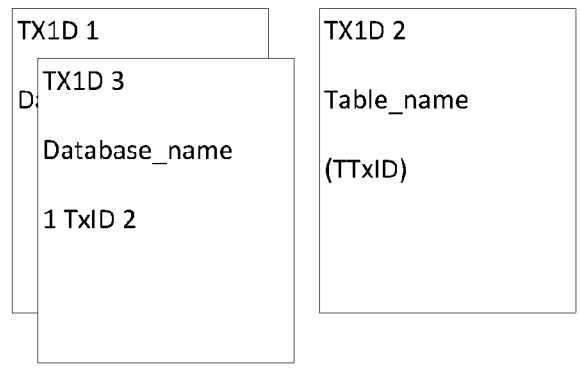
Figure 3A:
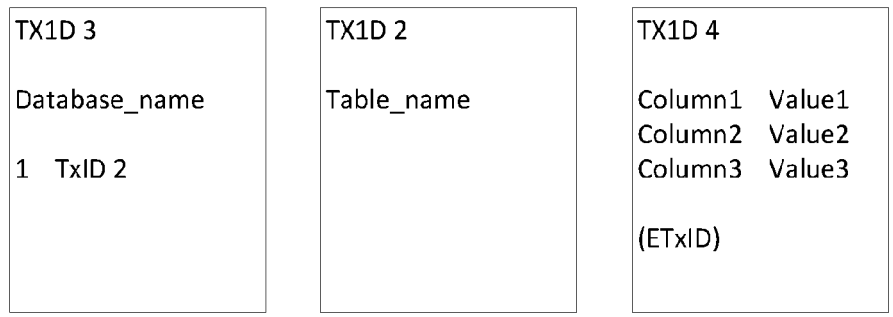
Figure 3A:
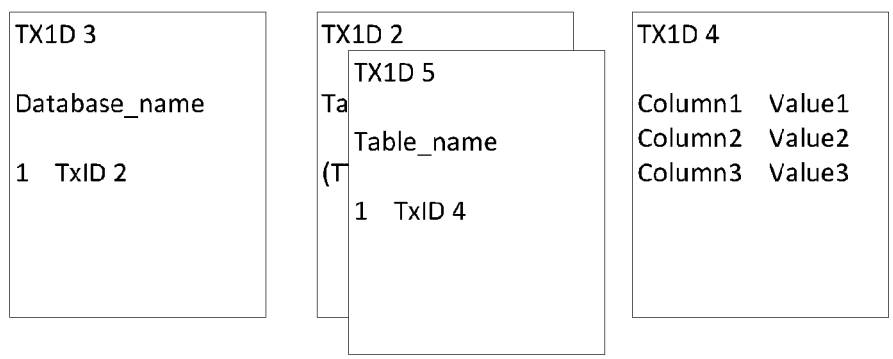
Figure 3A:
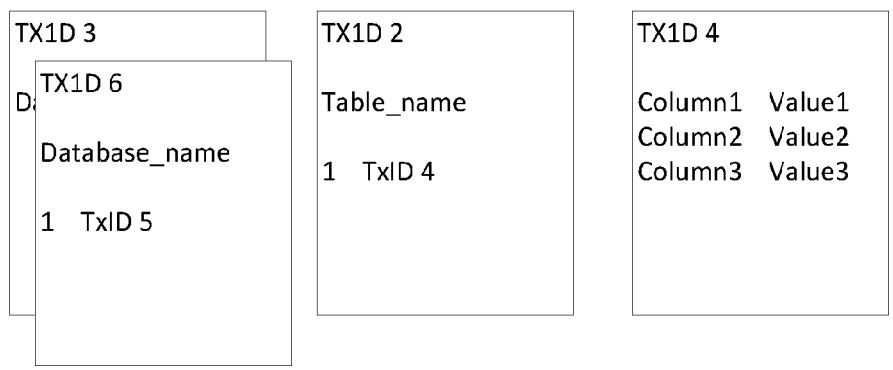
Figure 3B:
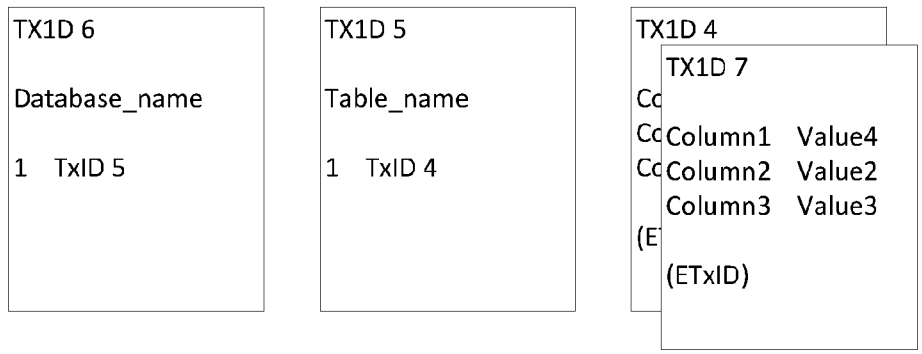
Figure 3B:
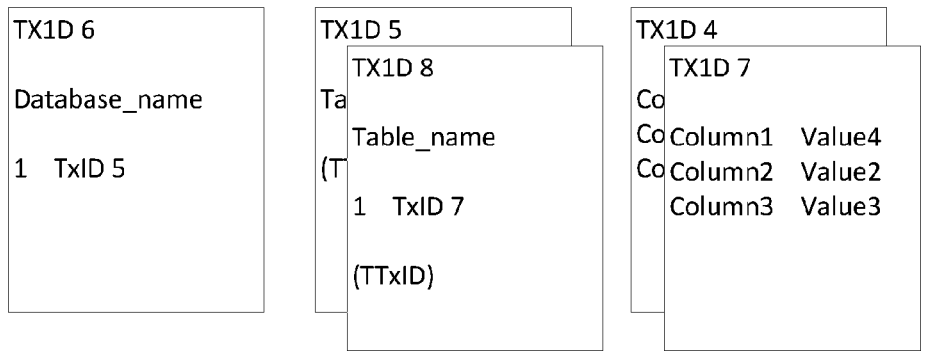
Figure 3B:
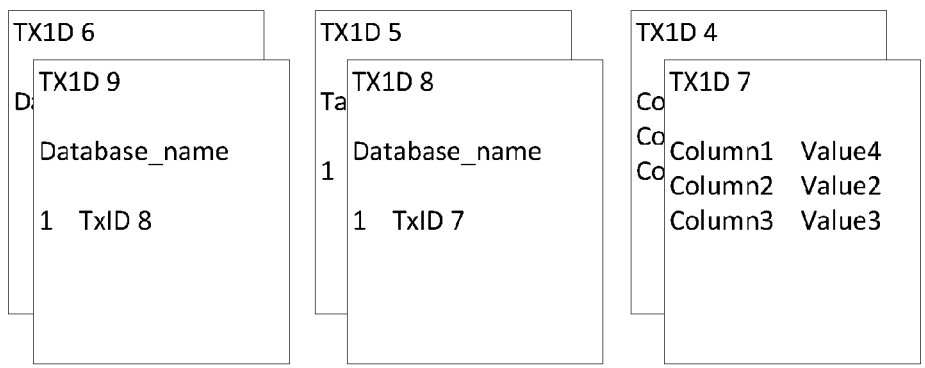
Figure 3C:
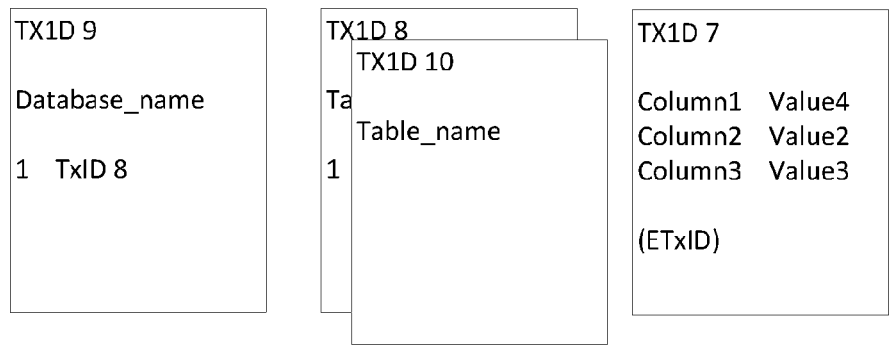
Figure 3C:
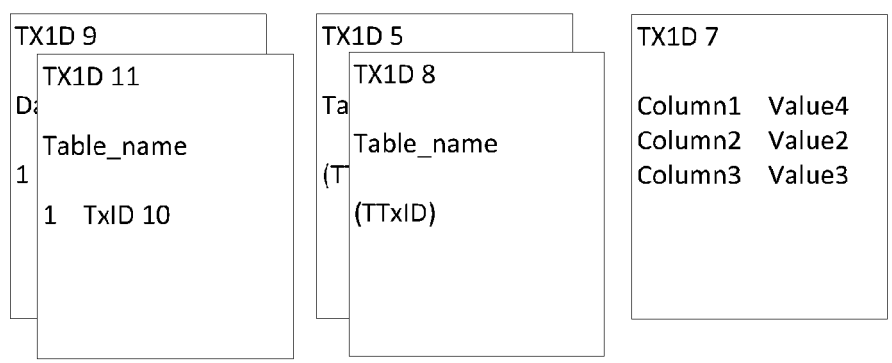

Given that SQL and its functions as well as commands are commonly used in existing databases, including distributed databases, embodiments of the present disclosure provide methods of implementing standard SQL commands for carrying out one or more standard database operations for the blockchain implemented data structure as shown in FIG. 2. For easier adoption and interoperability with current database systems, FIGS. 3a to 3c depict methods to indicate how standard SQL commands can be applied to the blockchain database using one or more consecutive transactions that are associated with the blockchain. In FIGS. 3a to 3c a selection or WRITE SQL commands (create, update/insert, modify, or delete) are shown, however, similar methods can be applied to map the entire SQL library.

FIG. 3a is a schematic diagram depicting the following SQL database commands, when executed by one or more processor associated with a DBMS that manages the data structure of FIG. 2. In some embodiments, one or more processors associated with an SQL server that is either associated with or communicatively coupled to the DBMS may also be used to implement one or more of the below commands:

The command CREATE DATABASE can be implemented including the steps of:

TxID1—generating a first transaction to create a first database, the first transaction based on the database transaction type of the data structure, and providing an output for the first transaction based on the created first database (database name);

Then responsive to a request or a transaction associated with the first database the following SQL commands are implemented by the following transactions CREATE TABLE including the steps of:

TxID2—generating a second transaction to create a first table, the second transaction based on the table transaction type of the data structure; and providing an output for the second transaction based on the created first table and including an identifier of the second transaction (TTxID).

TxID3—generating a third transaction based on the output of the second transaction including the steps of updating the database transaction type of the first database with the identifier associated with the second transaction (TTxID) and providing an output for the third transaction based on the updated first database.

Then, responsive to a request or a transaction associated with the first table, the following SQL command is executed based on the below transactions:

INSERT INTO TABLE including the steps of:

TxID4—generating a fourth transaction to create a first entry in the first table, the fourth transaction based on the entry transaction type of the data structure and providing an output for the fourth transaction based on the created entry and including an identifier of the fourth transaction (ETxID).

TxID5—generating a fifth transaction based on the output of the fourth transaction including the steps of:

updating the table transaction type of the first table with the identifier associated with of the fourth transaction (ETxID) and providing an output for the fifth transaction, the output based on the updated first table, and an identifier of the fifth transaction (TTxID).

TxID6—generating a sixth transaction based on the output of the fifth transaction including the steps of:

updating the database transaction type of the first database with the identifier associated with of the fifth transaction (TTxID) and providing an output for the sixth transaction based on the updated first database.

FIG. 3b is a schematic diagram depicting the following SQL UPDATE database command, when executed by one or more processor associated with a DBMS that created and/or manages the data structure of FIG. 2.

Responsive to a request or a transaction associated with the first table, modifying the first table using an UPDATE/MODIFY command that is implemented using blockchain transactions comprising the steps of:

TxID7—generating a seventh transaction to modify the reference and/or the value of the data pair associated with the first entry in the first table. This is followed by updating the entry transaction type of the first entry with a modified entry based on the seventh transaction and providing an output for the seventh transaction based on the modified entry including an identifier of the seventh transaction (ETxID).

TxID8—generating an eighth transaction based on the output of the seventh transaction including the steps of:

updating the table transaction type of the first table with the identifier associated with of the seventh transaction (ETxID) and providing an output for the eighth transaction based on the updated first table and including an identifier of the eighth transaction(TTxID).

TxID9—generating a ninth transaction based on the output of the eighth transaction including the steps of:

updating the database transaction type of the first database with the identifier associated with the eighth transaction (TTxID) and providing an output for the sixth transaction based on the updated first database.

FIG. 3c is a schematic diagram depicting the following SQL DELETE database command, when executed by one or more processor associated with a DBMS that created and/or manages the data structure of FIG. 2.

Responsive to a request or a transaction associated with the first table, modifying the first table using a DELETE FROM command that is implemented using blockchain transactions comprising the steps of:

TxID10—generating a tenth transaction to delete the first entry in the first table, including the steps of:

updating the table transaction type of the first table to remove the identifier associated with the fourth transaction (ETxID) and providing an output for the tenth transaction based on the updated first table and including an identifier of the tenth transaction (TTxID).

TxID11—generating an eleventh transaction based on the output of the tenth transaction including the steps of:

updating the database transaction type of the first database with the identifier associated with the tenth transaction (TTxID) and providing an output for the eleventh transaction, the output including an identifier of the updated first database.

The above examples depict how some SQL commands may be performed using the blockchain based data structure of the first aspect. Some modifications from the above transaction flow are set out below, which are also within the scope of the present disclosure.

For many enterprise applications and existing databases, data is being added, removed, and changed continuously. For these high-volume cases, it may be impractical and economically inefficient to submit individual requests or database commands for each request, each needing a separate blockchain transaction.

Accordingly, in some embodiments of the present disclosure, requests can be advantageously batched to allow for more efficient resource management at both the entry and table levels. For inserting multiple entries (rows) into a single table, the data in the blockchain data structure can be indexed and concatenated in a single transaction. To update entry information, a non-spendable transaction (i.e., OP_RETURN transaction) could be copied over to the relevant spending transaction by changing only the relevant entry or entries. For related tables that share common entries, in some embodiments it may be possible to include them in the same transaction to limit the number of update transactions needed when the data is changed.

SQL servers may generally contain a record of all requests (transactions for a blockchain based data structure as proposed) to the database in a file called the transaction log. This usually acts as a backup of the database file in case of file corruption or deletion of data. The transaction log can be loaded to recreate the latest state of the database. However, in high volume systems this file can reach terabytes in size, making it difficult and expensive to store. In order to address this issue, some embodiments of the present disclosure provide an analogous logging system for a database implemented using a distributed ledger, i.e., the blockchain based data structure of FIG. 2, using a series of transactions. The series of request transactions can be stored within a single transaction using only the transaction identifier TxID of the latest transaction as a reference. This will advantageously dramatically reduce the size of the backup log. Furthermore, storing this back up log of a series of transactions on the blockchain advantageously also means that entities or companies will not have to store the backup themselves, but only keep record of the latest transaction. Advantageously, this log can also be used for auditing or regulatory requirements, as it provides a permanent immutable record of all updates to the database.

Second Aspect—Registration and Access Management for a DBMS That is Associated with Data Pertaining to Blockchain Transactions A data management system (DBMS) functions to facilitate the SQL requests and structure the data relating to one of more databases. For a blockchain based database, this is especially important for constructing and submitting the transactions (see FIGS. 3a to 3c), as well as keeping a record of the relevant transaction IDs (TxIDs) (see the data structure discussed in FIGS. 1 and 2). This data management system for the blockchain based data structure is analogous to the distributed database management system (DDMS) of conventional distributed databases, which serve to integrate distributed databases. This DBMS can manifest itself in a number of ways, i.e. one or more computing resources for remote third-party service, or a client application which can be constructed for a client entity that may have or may be associated with computing resources or processing/network power and availability to manage their own DBMS.

In the second aspect of the present disclosure, an identity and access verification technique for client entities wishing to access data that is managed by the DBMS and associated with one or more blockchain transactions is discussed. In some embodiments the methods associated with the second aspect are implemented by one or more processors associated with the DBMS. In some embodiments the methods of the second aspect are implemented by a registration and access management system that is part of or associated with the DBMS in order to protect the integrity of the database and provide sufficient security. The database being managed by the DBMS in the second aspect is the blockchain based data structure of the first aspect. Advantageously, the methods associated with the second aspect allows for multi-level access or permission control such as read-only, write-only, or both read and write privileges for client entities wishing to perform data base operations.

Figure 4A:
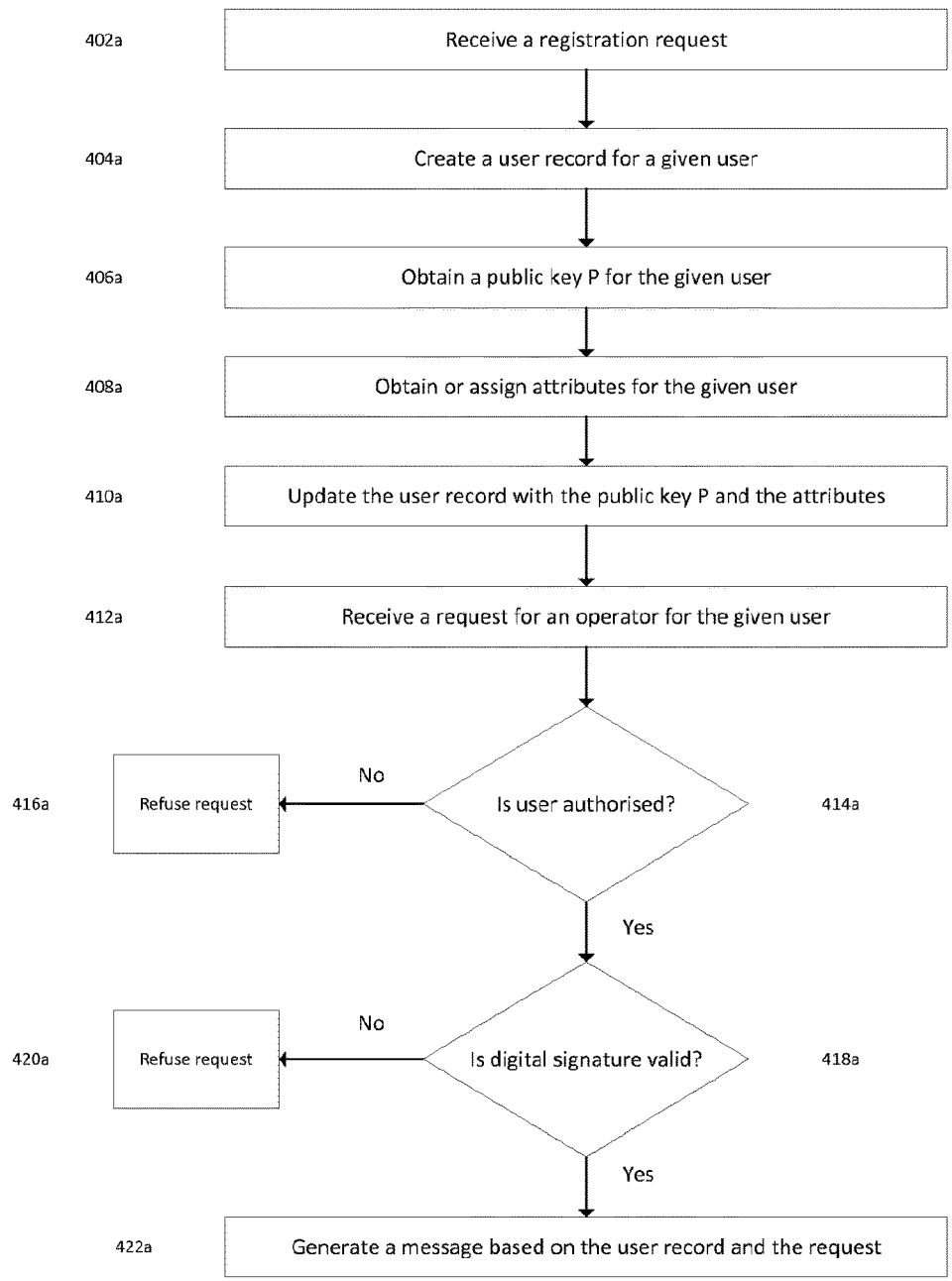
FIG. 4a is a flow diagram depicting an identity and access verification method for a DBMS for processing transactions associated with a distributed ledger, according to a second aspect of the present disclosure, the method implemented by one or more processors associated with the DBMS.

FIG. 4a is a flowchart depicting methods associated with an off-chain attribute-based access technique that can be used for verifying access to the database via the DBMS, and that can advantageously be adapted for any type of data or organisation. Access to the database or components of it are restricted, unless the user sending the request has one or more attributes associated with settings permitting the requested operation. FIG. 4a relates to the method implemented by one or more processors associated with the DBMS.

In step 402a, a request for registration with the DBMS is received by one or processors associated with the DBMS. The request for registration is in some embodiments a request received from one or more processors associated with a client entity for a given user that wishes to use, view or manipulate data in a blockchain implemented database, such as the data structure in FIG. 2.

Step 404a depicts the step of creating a record associated with a given user. The record may be stored in one or more memories or storage module associated with the DBMS or may be stored in a remote server or storage structure, to be retrieved as and when needed. The record including an identifier for the given user among a plurality of users. This may be user's name and other details that can be used to identify the user.

In step 406a, a public key P associated with the given user is obtained from the client entity. The public key being part of a cryptographic key pair associated with the given user, the cryptographic key pair also includes a private key V for the given user. The public and/or private keys for a given user can be generated by known methods as explained above in relation to the second aspect, such as based on a random number or secret seed.

Step 408a depicts obtaining or assigning one or more attributes associated with the given user, wherein each attribute is associated with a setting relating to access to a database managed by the DBMS. For instance, the settings may be permission settings for an attribute, which may be a name of a team or department, such as HR or accounts as discussed above. In some examples, the setting may be a flag or a binary toggle (0 or 1) or a state that indicates if read/write permission to access a component of the database is allowed or not for a given user with that particular attribute. The attribute settings are either obtained from the client entity, or in some embodiments the attributes are pre-assigned by the DBMS depending on the identity of the given user. The settings may be obtained in association with the attribute from the client entity or may be pre-assigned for certain attributes received by a system administrator module of the DBMS.

Step 410a depicts updating the record based on the obtained public key P and the one or more attributes and, if received the permission settings associated with the given user. In some embodiments, the user record is stored either at or in association with the DBMS in one or more storage areas from which it may be later accessed, as explained in the below steps. Such storage may also be possible at a remote computing resource.

Step 412a depicts obtaining a request for an operation associated with the database from a client entity, the client entity associated with a given user among a plurality of users. The request includes a digital signature associated with the given user sending the request in this step.

In step 414a it is firstly determining if the given user that made the request in the previous step is authorised to access the database, by checking if a user record exists for the given user. In other words, it is checked if the user making the request in the previous step is actually registered with the database, as explained in steps 402a to 410a above.

If the user is not registered, or if no user record is found for the user, then in step 416a, the request received in step 412a is rejected or refused. In some embodiments, an error notification to that effect may be generated.

If the user record is found, the given user making the request in step 412a is authorised. The method then proceeds to step 418a, where it is verified whether the digital signature is correctly associated with the given user that sent the request. This can be done by ensuring that the request can be validated or decrypted using the public key P that is present in the record for the given user. Only if the digital signature is based on the private key V, will it successfully be verified or decrypted using the paired public key P. This ensures that the request actually originated from the given user as identified in the user request, rather than from a malign party impersonating the given user.

If the digital signature cannot be verified using the public key P in the record, the request in step 412a is rejected in step 410a. In some embodiments, an error message may be generated to convey this rejection.

Responsive to successful verification of the digital signature, in step 422a a message based on a current instance of the user record and the request is generated by the DBMS. This message is generated in a format can be machine readable and that can be parsed by one or more DBMS components (such as explained below in relation to the third aspect). In some embodiments, the message includes details reflecting the attributes, settings (if received) as well as an indication of the database operation that is requested by the user.

Figure 4B:
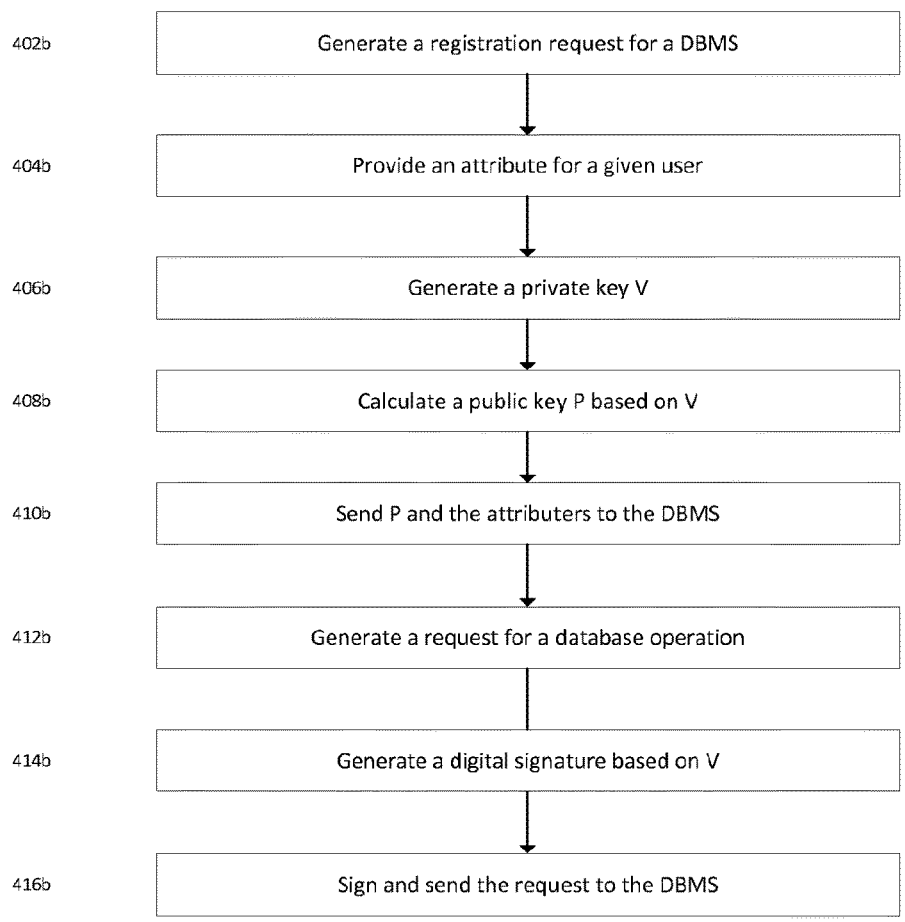
FIG. 4b is a flow diagram depicting an identity and access verification method for a DBMS for processing transactions associated with a distributed ledger, according to a second aspect of the present disclosure, the method implemented by one or more processors associated with a client entity.

FIG. 4b relating to the second aspect is complementary to the method explained in FIG. 4a above, but implemented by one or more processors of a client entity that is associated with the given user making the request for registration and/or an operation associated with the database, such as the blockchain implemented data structure as seen in FIG. 2.

Step 402b depicts generating a request for registering with the DBMS, the request associated with the given user that is associated with the client entity that is sending the request.

Step 404b depicts providing or accessing one or more attributes associated with the given user, each attribute associated with a setting relating to the database managed by the DBMS. If the attributes are available at the client entity, this is included as part of the registration request. If not, these attributes (and settings, if available) are obtained from a different system or memory for the given user.

Step 406b depicts generating a private key V associated with the given user, the private key being part of a cryptographic key pair that includes a public key P for the given user. This private key is not shared with any other entity or the DBMS. It may be generated by any known means, such as using a common secret or a generator etc., and this method of generation is beyond the scope of this disclosure. In some embodiments the public as well as private key may be ephemeral keys generated periodically or at arbitrary intervals to increase security of the system.

Step 408b depicts calculating the public key P based on the private key V. This key is related to the private key V as it will not be possible to validate any message signed by the private key V, without the public key P of the cryptographic key pair, and vice-versa.

Step 410b depicts sending the public key P and the one or more attributes to the DBMS using one or more known data transmission protocols over a communication network such as the Internet.

Step 412b depicts generating a request for an operation associated with the database, the request being associated with a given user. For ease of reference, in this Figure this is taken to be the same user sending the registration request in step 402b. In other embodiments, this step and the following steps may be carried by a different client entity for a different user also registered with the DBMS.

Step 414b depicts generating a digital signature based on a private key V for the given user, the private key being part of a cryptographic key pair that includes a public key P for the given user; where the public key P is provided to the DBMS during the registration process as discussed in steps 402b to 410b.

Step 416b depicts applying the digital signature to the request and sending the signed request to the DBMS. In some embodiments, if the request is rejected by the DBMS (for unsuccessful authorisation or if there is a failed verification of the digital signature), the client entity may receive an error message from the DBMS in response to the request.

Third Aspect—Command Interpretation and Transaction Construction for a DBMS that is Associated with Data Pertaining to Blockchain Transactions As mentioned in relation to the second aspect, a data management system facilitates the SQL requests and processes the requests for a database, such as the blockchain based database in FIG. 2. The third aspect of the present disclosure relates to a method for interpreting and processing database requests for performing operations in relation to the blockchain database. In some embodiments, the method of the third aspect when implemented by one or more processors of the DBMS effectively acts as an SQL compiler, as well as performs verification of the attributes (following the authorisation and identity verification of the second aspect).

Figure 5:
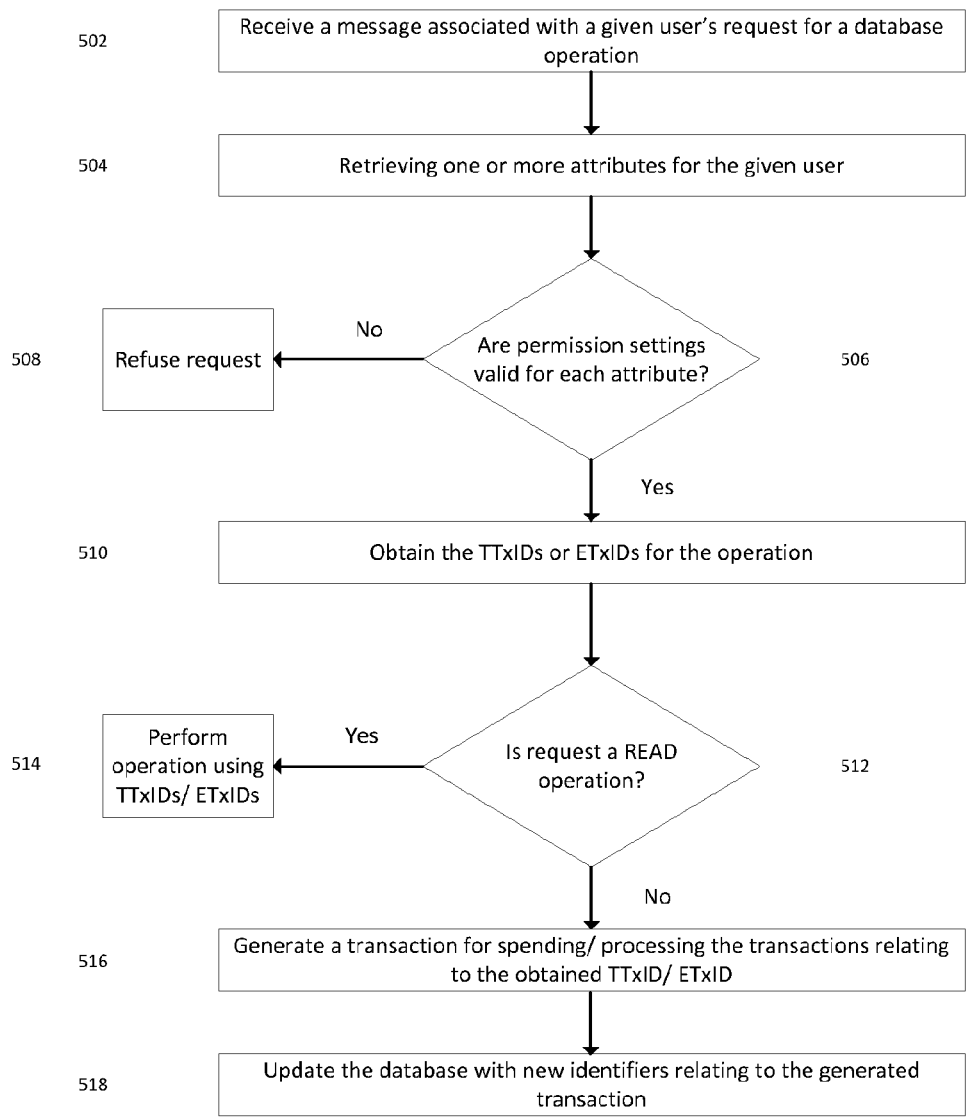
FIG. 5 is a flow diagram depicting a method for implementing a DBMS for managing data associated with transactions according to a third aspect of the present disclosure, whereby the transactions associated with a distributed ledger, and whereby the method implemented by one or more processors associated with the DBMS.

FIG. 5 is a flow chart depicting methods associated with interpreting and processing one or more SQL commands or requests for operation of a database, the database being a blockchain implemented data structure as seen in FIG. 2.

Step 502 depicts receiving a message associated with a current instance of a user record for a given user among one or more users, the message also including a request associated with the database. In some embodiments, this message is as described in step 422a of FIG. 4a, and the request is the request for operation provided by the given user. The request may be a read request, or a request to write, i.e., update/insert, modify, or delete the data in the database.

In step 504, the attributes associated for the given user are retrieved from the message in step 502. If the settings are provided in user record, then this is also obtained. In some embodiments these settings are permissions associated with the attribute which may be pre-set and stored in a memory associated with the DBMS. In any case, both the attributes and their associated permissions (settings) for one or more types of database operations are retrieved in this step.

In step 506, it is then verified if the permission setting for each of the retrieved attributes is valid for the request made by the given user. In other words, the SQL request is parsed, and the required database attributes are checked against the settings that are associated with the respective attributes for a given user. In some embodiments, taking the user and attributes as objects, this check may be performed based on using a simple Boolean check as follows: (object instance).(database attribute)==true If there are more than one attributes to be verified based on their respective permission settings, the attributes can be combined or chained using AND as well as OR operations. Failure of access conditions for the attribute would in some embodiments trigger a PERMISSION ERROR message to be displayed to the user and the request would not progress further and be rejected, as seen in step 508.

Should the access conditions be met, in some embodiments the SQL request is compared against the SQL command library. If no such command is in the library or if it is not recognised by the DBMS, a REQUEST ERROR message may be returned to the user. If it is a valid function, the method then progresses to step 510.

Step 510 depicts obtaining one or more transaction identifiers (TTxID, ETxID) related to the request, each obtained transaction identifier pertaining to a transaction, whereby the data for said transaction is associated with the data structure. This step also includes accessing the data relating to the obtained transaction identifier (TTxID, ETxID) from the data structure.

Once the data is now accessible, it is then determined in step 512 whether the request is a READ or WRITE operation that is to be performed using the accessed data.

If it is a READ operation where data is not updated in any manner, then the operation of retrieving the accessed data for provision to one or more processors or display devices associated with the DBMS or an interface on the client entity is performed in step 514. In some embodiments, for a READ operation (a database query), the relevant TxIDs are gathered and constructed the system's memory. The queries are performed, and a summary table is constructed and returned to the user.

If the request is associated with a WRITE operation, i.e., create, update/insert, modify, or delete operation such as those seen in FIGS. 3a to 3c and explained above in relation to the first aspect, then in addition to obtaining the data in step 512, the method further includes in step 516 the process of generating one or more transactions for spending or processing the transaction(s) associated with the obtained one or more transaction identifiers (TTxID, ETxID) based on the operation. In some embodiments, for a WRITE operation, the appropriate TxID (or TxIDs) that need to be updated are collected and passed to a transaction constructor that may be one or processor associated with the DBMS. This transaction constructor may be associated with an SPV wallet for communication with the distributed ledger, as explained above.

Simultaneously, the OP_RETURN payloads may be constructed upon generation of new transactions for the blockchain. This is similar to the generation of transactions for the commands as set out in FIGS. 3a to 3c for example, in addition to including the user's digital signature. The digital signature advantageously provides an auditable record of the request submissions that can be verified with the user record, without the user having to interact with the blockchain directly and can be used to verify submissions for a given user at the time of submission or at any point in the future. This advantageously provides interoperability with conventional systems while still maintaining an immutable record on the blockchain. In some embodiments, the OP_RETURN payload can then be encrypted using a deterministic derived key prior to being passed to the transaction constructor.

Transaction construction can be done in a number of ways in step 51. For example, having received the necessary TxIDs and the OP_RETURN payload, the transaction(s) can then be constructed using a local (to the DBMS) simple payment verification (SPV) client or wallet for the DBMS, that connects to the blockchain network via peer-to-peer connections to full nodes. The SPV client or wallet itself does not mine or store a copy of the blockchain.

An example of transaction construction pseudo code is provided below as an example:

The transaction object is instantiated using the constructor:

tx=Transaction(NetworkParameters params)

The spendable output is added first, linking to an address held by the system for the SPV client of the DBMS (address_i). The address can be generated using the hash of a public key derived in a known deterministic derivation scheme:

tx.addOutput(Coin.MIN_NONDUST_OUTPUT,
    Address address_i)

The OP_RETURN payload is stored in a variable OPR_DATA and then added to a transaction using the addOutput function as follows:

tx.addOutput(Coin.MIN_NONDUST_OUTPUT,newScriptBuilder( )op(ScriptOpCodes. OP_RETURN).data (OPR_DATA.getBytes).build( )

The corresponding UTXO reference is stored in a variable named prevOut. After this, the required private key V for spending this output is retrieved and the corresponding public key is P stored in a variable sigKey.

Finally, the private key V is used to sign the transaction (without TxID and unlocking script) using the ECDSA. The signature data (sig) and public key are stored as:

scriptPubKey=OP_PUSH sig OP_PUSH sigKey

The input data is then added to the transaction object using the addSignedInput function:

tx.addSignedInput(TransactionOutPoint prevOut, Script scriptPubKey, ECKey sigKey)

The transaction can then be submitted to the network via the SPV wallet to a full node for verification and inclusion in the block:

tx.broadcastComplete.get( )

In step 518, one or more of the entry transaction datatype, table transaction datatype and/or the database transaction datatype associated with the blockchain based data structure in FIG. 2 is then updated with the TxID of the newly constructed or generated transactions.

Figure 6:
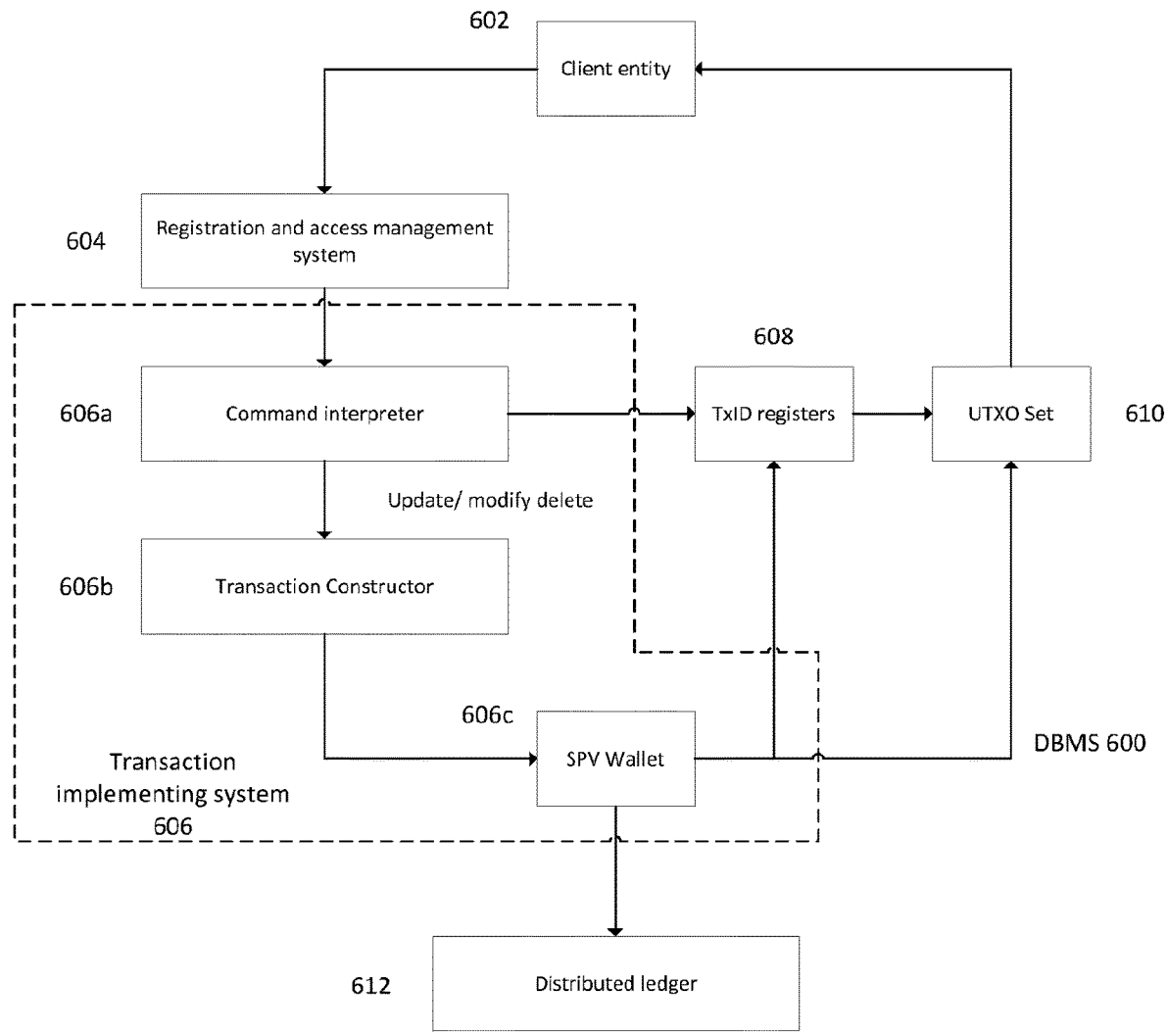
FIG. 6 is a schematic diagram depicting a DBMS for use with transactions associated with a distributed ledger in accordance with second and/or third aspects.

FIG. 6 is a schematic diagram depicting a data management system or a data or database management system (DBMS) 600 as discussed in relation to the second or the third aspects of the present disclosure for managing the storage, access and manipulation of data in a blockchain based data structure as seen in FIG. 2.

This is analogous to the distributed database management system (DDMS) of conventional distributed databases, which serve to integrate distributed data systems. This DBMS 600 system can be a remote or third-party service implemented by one or more remote servers, or it may be associated with a client application.

Regardless of the implementation, the DBMS 600 includes the following components A registration and access management system 604 based on the methods discussed in relation to the second aspect above for providing access control for read/write privileges for a user that is associated with a client entity 602.

A transaction implementation system 606 for interpreting and executing standard SQL commands to create transactions or queries for data associated with the blockchain data structure, as explained in relation to the third aspect. This component may include a command interpreter 606a that behaves as an SQL compiler, a transaction constructor 606b that constructs series of transactions to be submitted and an SPV Wallet 606c for output execution management, transaction submission, network monitoring etc. when liaising or communicating with the blockchain 612.

A UTXO Set 610 and TxID Registers 608 for recording all TxIDs and latest data in UTXO set, in association with the DBMS 600.

To facilitate quick and simple access to the data, the DBMS 600 may be provided with an indexed copy of the UTXO set 610 or a subset containing the latest relevant transactions to the database. This is integrated with the SPV wallet 606c that tracks the keys associated with the users (i.e., client entities that are full nodes that request to either register or access the database/DBMS) to record updates (spending) of UTXOs. A separate record of the indices is stored as TxID register 608 so the OP_RETURN data can be retrieved for queries.

The indices can be a simple running integer count or more detailed data such as names, function output values or hash values. A transaction identifier TxID of the database transaction is all that is required as it contains the relevant TTxIDs or ETxIDs to reassemble the database or entire data structure. However, to reduce the number of update transactions required, it is also possible to store the TTxIDs or ETxID in some embodiments and organize into the relevant database structures off-chain. Access attributes can be stored with the TxID registers 608 that can be checked during the settings/permission verification steps performed in the second aspects of the present disclosure by the registration and access management system.

The components of the DBMS 600 provide a sequence in processing user requests to provide a single point of reference for the distributed data associated with the blockchain 612. The functions and components of the DBMS 600 can be performed or implemented on or off-chain using the same methods as set out in relation to the second and the third aspect above.

Figure 7:
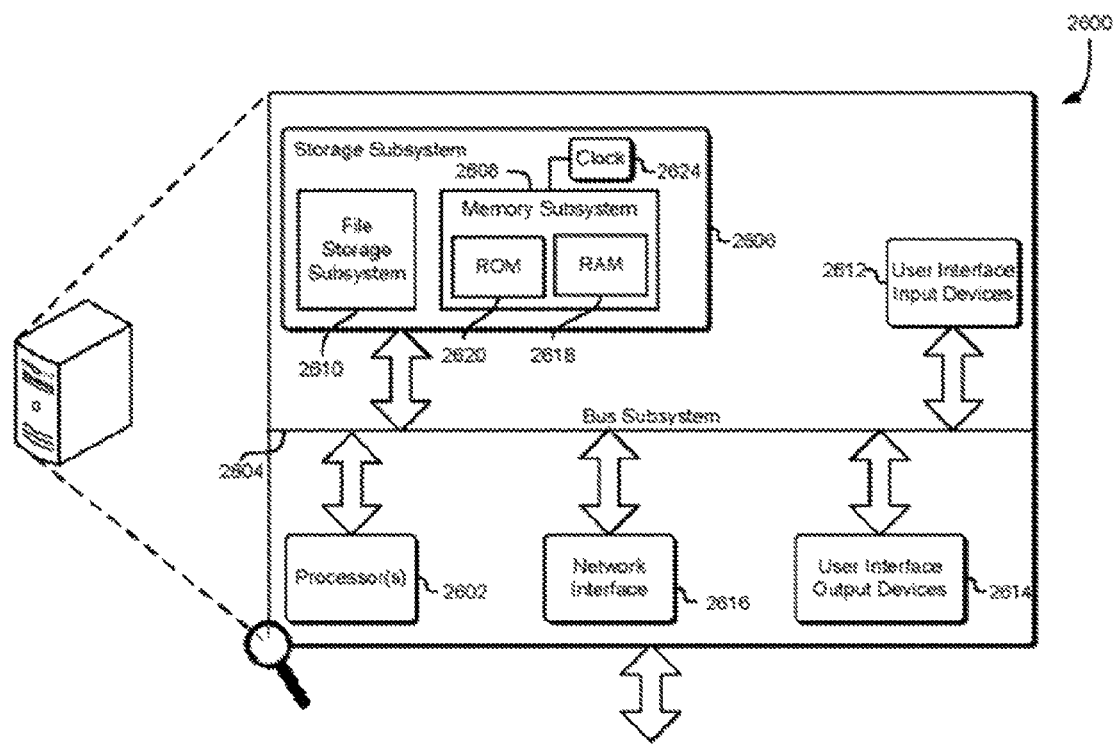
FIG. 7 is a schematic diagram illustrates a computing environment in which various aspects and embodiments of the present disclosure can be implemented.

Turning now to FIG. 7, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured to be used as one or more components of DBMS of FIG. 7, or the computing device 2600 may be configured to be a client entity that is associated with a given user, the client entity making database requests for a database that is managed by the DBMS of FIG. 6. Thus, computing device 2600 may be a portable computing device, a personal computer, or any electronic computing device. As shown in FIG. 7, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read only memory (ROM) 2620 as shown. The storage subsystem 2606 and the cache memory 2602 may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606.

These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 7 is intended only as a specific example for purposes of illustrating the preferred embodiment of the device. Many other configurations having more or fewer components than the system depicted in FIG. 7 are possible.

Enumerated Example Embodiments

The present disclosure is hereby discussed based on the following clauses that are related to the above aspects, which are provided herein as exemplary embodiments for better explaining, describing, and understanding the claimed aspects and embodiments.

1. A computer implemented method of providing a data structure for storing and/or managing data associated with one or more transactions pertaining to a distributed ledger, the method implemented by one or more processors associated with a data management system (DBMS) for the distributed ledger, the method comprising the steps of:
   creating a database transaction type, said database transaction type comprising:
      an identifier for a database D that is to be used to obtain data for one or more transactions pertaining to a distributed ledger; and
      one or more table transaction identifiers (TTxID), wherein a given TTxID among the one or more TTxIDs is specific to a given table among one or more tables associated with the identified database D, wherein the given TTxID relates to a transaction pertaining to a distributed ledger for the given table; and creating a table transaction type, said table transaction type comprising:
      an identifier for a table T, the table being among the one of more tables associated with the identified database D; and one or more entries associated with the identified table T.
2. The method as set out in clause 1, wherein the table transaction type further comprises:
one or more entry transaction identifiers (ETxID), wherein a given ETxID among the one or more ETxIDs being specific to a given entry among the one or more entries associated with the identified table T, and wherein the given ETxID relates to a transaction pertaining to the distributed ledger for the given entry;
the method further comprising:
creating an entry transaction type, the entry transaction type comprising:
one or more data pairs, wherein each data pair relates to an entry in the identified table T, and wherein each data pair comprises a reference R identifying a position in the identified table, and a value VL for the identified position.
3. The method as set out in clauses 1 or 2, wherein the transaction relating to the one or more TTxIDs or ETxIDs is associated with one or more unspent transaction outputs (UTXOs).
4. The method as set out in clause 3, wherein the UXTO for the given transaction includes an output script that is spendable by a subsequent transaction associated with the identified database D and/or table T.
5. The method as set out in any one of clauses 3 or 4, wherein the UTXO for the given transaction includes a non-spendable output that is associated with the spendable output script for the given transaction.
6. A data structure for storing and/or managing data associated with one or more transactions pertaining to a distributed ledger, the data structure being managed by one or more processors associated by a database management system (DBMS) for the distributed ledger, the data structure including a data transaction type and a table transaction type created according to the method according to any one of clauses 1 to 5.
7. The data structure as set out in clause 6, wherein the data structure is a nested transaction storage structure, wherein the data structure further comprises an entry data type created according to the method of any one of clauses 2 to 5, said data structure configured to store the identified database D based on storing TTxIDs and ETxIDs associated with the identified database D.
8. A computer implemented method for implementing one or more transactions associated with a distributed ledger, the transaction using the data structure provided by one of the preceding clauses, the method implemented by one or more processors associated with a data management system (DBMS) and comprising the steps of:
creating a database including the steps of:
generating a first transaction to create a first database, the first transaction based on the database transaction type of the data structure;
providing an output for the first transaction based on the created first database; and
responsive to a request or a transaction associated with the first database; updating the first database including the steps of:
generating a second transaction to create a first table, the second transaction based on the table transaction type of the data structure; and
providing an output for the second transaction based on the created first table, and including an identifier of the second transaction (TTxID); and
generating a third transaction based on the output of the second transaction including the steps of:
updating the database transaction type of the first database with the identifier associated with the second transaction (TTxID); and
providing an output for the third transaction based on the updated first database.
9. The method as set out in clause 7, further comprising the steps of:
responsive to a request or a transaction associated with the first table, populating the first table including the steps of:
generating a fourth transaction to create a first entry in the first table, the fourth transaction based on the entry transaction type of the data structure; and
providing an output for the fourth transaction based on the created entry, and including an identifier of the fourth transaction (ETxID);
generating a fifth transaction based on the output of the fourth transaction including the steps of:
updating the table transaction type of the first table with the identifier associated with the fourth transaction (ETxID); and
providing an output for the fifth transaction, the output based on the updated first table, and an identifier of the fifth transaction (TTxID); and
generating a sixth transaction based on the output of the fifth transaction including the steps of:
updating the database transaction type of the first database with the identifier associated with the fifth transaction (TTxID); and
providing an output for the sixth transaction based on the updated first database.
10. The method as set out in clause 9, comprising the steps of:
responsive to a request or a transaction associated with the first table,
modifying the first table including the steps of:
generating a seventh transaction to modify the reference and/or the value of the data pair associated with the first entry in the first table;
updating the entry transaction type of the first entry with a modified entry based on the seventh transaction;
providing an output for the seventh transaction based on the modified entry, and including an identifier of the seventh transaction (ETxID);
generating an eighth transaction based on the output of the seventh transaction including the steps of:
updating the table transaction type of the first table with the identifier associated with the seventh transaction (ETxID); and
providing an output for the eighth transaction based on the updated first table, and including an identifier of the eighth transaction(TTxID); and
generating a ninth transaction based on the output of the eighth transaction including the steps of:
updating the database transaction type of the first database with the identifier associated with the eighth transaction (TTxID); and
providing an output for the sixth transaction based on the updated first database.

11. The method as set out in any one of clauses 9 or 10, comprising the steps of:
  responsive to a request or a transaction associated with the first table, modifying the first table including the steps of:
    generating a tenth transaction to delete the first entry in the first table, including the steps of:
      updating the table transaction type of the first table to remove the identifier associated with the fourth transaction (ETxID); and
      providing an output for the tenth transaction based on the updated first table, and including an identifier of the tenth transaction (TTxID); and
    generating an eleventh transaction based on the output of the tenth transaction including the steps of:
      updating the database transaction type of the first database with the identifier associated with the tenth transaction (TTxID); and
      providing an output for the eleventh transaction, the output including an identifier of the updated first database.

12. A computer implemented method for implementing one or more transactions associated with a distributed ledger, the transaction using the data structure provided by any one of clauses 1 to 7, the method implemented by one or more processors associated with a client entity and comprising the steps of:
  sending a request to one or more processors associated with a DBMS for creating a first database;
  monitoring a distributed ledger for at least one transaction output associated with the created first database D;
  sending a request to the one or more processors associated with the DBMS for creating a first table for the first database;
  monitoring the distributed ledger for at least one transaction output associated with the first table (TTxID); and
  sending a request to the one or more processors associated with the DBMS for updating the first table with a first entry, wherein the first entry includes a data pair comprising a reference identifying a position in the first table, and a value for the identified position.

13. A computer implemented method for implementing one or more transactions associated with a distributed ledger, the transaction using the data structure provided by any one of claims 1 to 7, the method implemented by one or more processors associated with a client entity and comprising the steps of:
  monitoring the distributed ledger for at least one transaction output associated with a first entry (ETxID) in a first table of a first database;
  sending a request to one or more processors associated with a DBMS for modifying the first entry, the request including a request to modify the reference and/or the value of the data pair associated with first entry; and
  monitoring a distributed ledger for at least one transaction output associated with an identifier for an updated first table (TTxID) and/or an updated first database D incorporating the modified first entry.

14. A computer implemented method for implementing one or more transactions associated with a distributed ledger, the transaction using the data structure provided by any one of clauses 1 to 7, the method implemented by one or more processors associated with a client entity and comprising the steps of:
  monitoring the distributed ledger for at least one transaction output associated with an identifier for a first table (TTxID) of a first database;
  sending a request to one or more processors associated with a DBMS for deleting the first entry of the first table; and
  monitoring a distributed ledger for at least one transaction output associated with an identifier for an updated first table (TTxID) and/or an updated first database.

15. A computer implemented method for managing access to a data management system (DBMS), the DBMS managing data pertaining to transactions associated with a distributed ledger, the data being provided in a database, the method comprising the step of:
  responsive to a request for registration with the DBMS, creating a record associated with a given user, the record including an identifier for the given user among a plurality of users;
  obtaining a public key P associated with the given user; the public key being part of a cryptographic key pair associated with the given user, the cryptographic key pair including a private key V for the given user;
  obtaining or assigning one or more attributes associated with the given user, wherein each attribute is associated with a setting relating to access to a database managed by the DBMS;
  updating the record based on the obtained public key P and the one or more attributes associated with the given user; and
  storing or providing the updated record in association with the DBMS.

16. The method as set out in clause 15, wherein the setting for a given attribute confirms if the given attribute is associated with permission to perform one or more of a read, write, modify or delete operation associated with the database.

17. The method as set out in any one of clauses 15 or 16, wherein the setting for each attribute is provided in the request, or the setting is obtained from a computing resource associated with the DBMS, or the setting is predetermined for each attribute for the database managed by the DBMS.

18. A computer implemented method for implementing a data management system (DBMS) for managing a database pertaining to transactions associated with a distributed ledger, the method comprising the steps of:
  obtaining a request for an operation associated with the database from a client entity, the client entity associated with a given user among a plurality of users, wherein the request includes a digital signature associated with the given user;
  determining that the given user is authorised to access the database;
  responsive to successful determination, verifying that the digital signature is associated with the given user based on a user record associated with the DBMS; and
  responsive to successful verification, generating a message based on a current instance of the user record and the request.

19. The method as set out in clause 18, wherein the request is a request to read, write, modify or delete data in the database.

20. The method as set out in any one of clauses 15 to 19, wherein the database is implemented using the data structure as provided by any one of clauses 1 to 7.
21. The method as set out in any one of clauses 16 to 18, wherein the user record is created upon registration of the given user with the DBMS according to the method of any one of clauses 15 to 17.
22. The method as set out in clause 21, wherein the step of determining that the user is authorised includes determining that a user record associated with the DBMS is present for the given user upon registration of the given user with the DBMS.
23. The method as set out in any one of clauses 22 or 22, wherein the step of verifying the digital signature is based on determining that the private key V or a signing key K used to sign the request is associated with the public key P associated with the given user in the user record.
24. The method as set out in any one of clauses 18 to 23, comprising, responsive to the determination being unsuccessful, generating an error notification to specify that the given user is not authorised or is not registered to access the database.
25. The method as set out in any one of clauses 18 to 23, comprising, responsive to the verification of the digital signature being unsuccessful, generating an error notification to specify that the signature applied to the request is not valid for the given user.
26. A computer implemented method for registering with a database management system (DBMS), the DBMS associated with data pertaining to transactions associated with a distributed ledger, the method being implemented by one or more processors associated with a client entity, the client entity associated with a given user among a plurality of users, the method comprising the steps of:
   generating a request for registering with the DBMS, the request associated with the given user;
   providing or accessing one or more attributes associated with the given user, each attribute associated with a setting relating to the database managed by the DBMS;
   generating a private key V associated with the given user, the private key being part of a cryptographic key pair that includes a public key P for the given user;
   calculating the public key P based on the private key V; and
   sending the public key P and the one or more attributes to the DBMS.
27. A computer implemented method for accessing data associated with a data management system (DBMS), the DBMS associated with data pertaining to transactions associated with a distributed ledger, the method being implemented by one or more processors associated with a client entity, the client entity associated with a given user among a plurality of users, the method comprising the steps of:
   generating a request associated with a database, the request associated with the given user, and the database managed by the DBMS;
   generating a digital signature based on a private key V for the given user, the private key being part of a cryptographic key pair that includes a public key P for the given user; the public key P being provided to the DBMS;
   applying the digital signature to the request; and
   sending the signed request to the DBMS.
28. The method as set out in clause 27, comprising generating a signing key K based on the private key V wherein the signing key is an ephemeral key.
29. The method as claimed in clauses 27 or 28, including the method of registration with the DBMS as set out in clause 26.
30. A computer implemented method for implementing a data management system (DBMS) for managing a database pertaining to transactions associated with a distributed ledger, the method comprising the steps of:
   receiving a message associated with a current instance of a user record for a given user among one or more users, and a request associated with the database, the request being provided by the given user;
   parsing the request associated with a database, including:
      retrieving one or more attributes associated with the given user from the current instance; and
      verifying that the setting for each of the retrieved attributes is valid for the request made by the given user; and
   responsive to successful verification, performing one or more operations associated with the database based on the request, wherein the database is based on a data structure provided according to any one of clauses 1 to 6, the step of performing further including:
      if the request is associated with a read operation, obtaining one or more transaction identifiers (TTxID, ETxID) related to the request, each obtained transaction identifier pertaining to a transaction, whereby the data for said transaction is associated with the data structure; and
      accessing the data relating to the obtained transaction identifier (TTxID, ETxID) from the data structure;
      if the request is associated with a write or modify or delete operation, then in addition to the step of obtaining, the method further includes generating one or more transactions for spending or processing the transaction(s) associated with the obtained one or more transaction identifiers (TTxID, ETxID) based on the operation; and
      updating the data structure with identifiers relating to the generated transactions.
31. The method as set out in clause 30, wherein the step of verifying includes checking that the setting for a given attribute among the one or more attributes indicates that the given user has permission to access the database for the request made.
32. The method as set out in any one of clauses 30 or 31, wherein if the request is associated with a write, modify, or delete operation, then the step of performing further includes the method as set out in any one of clauses 7 to 9.
33. The method as set out in any one of clauses 30 to 32, wherein if the request is associated with a write, modify, or delete operation, the step of generating further includes:
   obtaining an output script associated with each obtained transaction identifier (TTxID, ETxID);
   constructing a further transaction based on the output script, the further transaction based a private key V associated with the given user, the private key being part of a cryptographic key pair that includes a public key P for the given user; and providing the further transaction to the distributed ledger, the further transaction associated with a further transaction identifier (TTxID, ETxID).

34. The method as set out in clause 33, wherein the step of constructing the further transaction is performed by a Simplified Payment Verification (SPV) client associated with the DBMS, wherein the SPV client communicatively couples the DBMS to the distributed ledger via a communication network.

35. The method as set out in any one of clauses 30 to 34, wherein each obtained transaction identifier (TTxID, ETxID) is associated with a transaction that includes a non-spendable UTXO, said non-spendable UTXO associated with or including a spendable payload, the spendable payload being a spendable UTXO.

36. The method as set out in clause 35, wherein each spendable and non-spendable UTXO is stored in a UTXO set or memory associated with the DBMS, wherein the non-spendable UTXO is an OP_RETURN output script.

37. The method as set out in clause 36, wherein one or more spendable UTXOs in the UTXO set or memory are used for constructing the further transaction 38. A computing device comprising:
    a processor; and
    memory including executable instructions that, as a result of execution by the processor, causes the device to perform the computer-implemented method of one of clauses 12 to 14 or 26 to 29;
    wherein the computing device is a client entity.

39. A DBMS system for managing access to data associated with one or more transactions pertaining to a distributed ledger, wherein the data managed by the DBMS is stored in a data structure as provided by any one of clauses 1 to 7, the DBMS comprising:
    a registration and access management system having one or more processors configured to execute instructions that to perform the computer-implemented method of one of clauses 15 to 25;
    a transaction execution system having one or more processors configured to execute instructions to perform the computer-implemented method of one of clauses 30 to 37;
    one or more registers for storing a plurality of transaction identifiers associated with the database; and
    a UTXO set or a memory for storing a copy of a plurality of UTXOs associated with the database.

40. A system comprising:
    one or more computing devices as set out in clause 38, each being a client entity;
    a DBMS as set out in clause 39; and
    a communication network for communicatively coupling each client entity with the DBMS, It should be noted that the above-mentioned embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises" and the like, do not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

Example Use Cases and Scenarios

READ Example Processing:

The power of relational databases stems from being able to aggregate relevant data across multiple tables. This is typically done using the JOIN SQL command between two tables. There are four sub-types of the JOIN:

1. INNER JOIN—returns values that are common in both tables
2. LEFT JOIN—returns all values from the left table and common values from right table
3. RIGHT JOIN—returns all values from the right table and common values from left table
4. OUTER JOIN—returns all values from both tables An INNER JOIN command would have the following form: SELECT table_name.column_name, table_name.column_name, . . .

FROM lefttable_name

INNER JOIN righttable_name ON [Matching Condition];

In this command, the first line chooses the reported column values in the query response and can be selected freely from both tables. The relevant table and entry data would be read from the UTXO set from the TxID references and stored in the system memory. The conditions would then be applied and collated for analysis and assembly.

The next line selects the 'left' table and can be chosen freely by the user.

The next line sets the join condition (inner join in this case) and specifies the right table to joined with.

Finally, the matching condition is specified, which is used to search the two tables for common elements. For example, to search a table of buyers and table of sellers by name the conditions would look like:

buyers.name=sellers.name

As this is performed entirely off chain by the DBMS, no transaction equivalent is required, and standard SQL protocols can be incorporated. This also allows the system to leverage standard efficiency optimization and scaling methods that have been explored extensively in the past few decades. This approach allows for easy interfacing with existing enterprise data management solutions (for example ORACLE, SAP, etc.).

The invention claimed is:

1. A computer implemented method for implementing a data management system (DBMS) for managing a database pertaining to transactions associated with a distributed ledger, the method comprising the steps of:
    receiving a message associated with a current instance of a user record for a given user among one or more users, and a request associated with the database, the request being provided by the given user;
    parsing the request associated with the database, including:
    retrieving one or more attributes associated with the given user from the current instance;
    verifying that a setting for each of the retrieved attributes is valid for the request made by the given user; and responsive to successful verification;

performing one or more operations associated with the database based on the request, wherein the database is based on a data structure, wherein the step of performing further including:
  if the request is associated with a read operation, obtaining one or more transaction identifiers (TTxID, ETxID) related to the request, each obtained transaction identifier pertaining to a transaction, whereby the data for said transaction is associated with the data structure; and
accessing the data relating to the obtained transaction identifier (TTxID, ETxID) from the data structure;
if the request is associated with a write or modify or delete operation, then in addition to the step of obtaining, the method further includes generating one or more transactions for spending or processing the transaction(s) associated with the obtained one or more transaction identifiers (TTxID, ETxID) based on the operation; and
updating the data structure with identifiers relating to the generated transactions.

2. The method as claimed in claim 1, wherein the step of verifying includes checking that the setting for a given attribute among the one or more attributes indicates that the given user has permission to access to the database for the request made.

3. The method as claimed in claim 1, wherein, if the request is associated with a write, modify or delete operation, then the step of performing further includes the method of storing the identified database D, based at least in part, on storing TTxIDs and ETxIDs associated with the identified database D, wherein the data structure further comprises an entry data type.

4. The method as claimed in claim 1, wherein if the request is associated with a write, modify or delete operation, the step of generating further includes:
  obtaining an output script associated with each obtained transaction identifier (TTxID, ETxID);
  constructing a further transaction based on the output script, and a private key V associated with the given user, the private key being part of a cryptographic key pair that includes a public key P for the given user; and
  providing the further transaction to the distributed ledger, the further transaction associated with a further transaction identifier (TTxID, ETxID).

5. The method as claimed in claim 4, wherein the step of constructing the further transaction is performed by a Simplified Payment Verification (SPV) client associated with the DBMS, wherein the SPV client communicatively couples the DBMS to the distributed ledger via a communication network.

6. The method as claimed in claim 1, wherein each obtained transaction identifier (TTxID, ETxID) is associated with a transaction that includes a non-spendable UTXO, said non-spendable UTXO associated with or including a spendable payload, the spendable payload being a spendable UTXO.

7. The method as claimed in claim 6, wherein each spendable and non-spendable UTXO is stored in a UTXO set or memory associated with the DBMS, wherein the non-spendable UTXO is an OP RETURN output script.

8. The method as claimed in claim 7, wherein one or more spendable UTXOs in the UTXO set or memory are used for constructing the further transaction.

9. A computing device comprising:
a processor; and
memory including executable instructions that, as a result of execution by the processor, causes the device to perform the method of claim 1;
wherein the computing device is a client entity.

10. A DBMS system for managing access to data associated with one or more transactions pertaining to a distributed ledger, wherein the data managed by the DBMS is stored in a data structure, wherein the DBMS comprises:
  a registration and access management system having one or more processors configured to execute instructions that perform a method comprising the steps of:
    responsive to a request for registration with the DBMS, creating a record associated with a given user, the record including an identifier for the given user among a plurality of users;
    obtaining a public key P associated with the given user; the public key being part of a cryptographic key pair associated with the given user, the cryptographic key pair including a private key V for the given user;
    obtaining or assigning one or more attributes associated with the given user, wherein each attribute is associated with a setting relating to access to a database managed by the DBMS;
    updating the record based on the obtained public key P and the one or more attributes associated with the given user; and
    storing or providing the updated record in association with the DBMS;
  a transaction execution system having one or more processors configured to execute instructions to perform; a method comprising the steps of:
    receiving a message associated with a current instance of a user record for a given user among one or more users, and a request associated with the database, the request being provided by the given user;
    parsing the request associated with a database, including:
      retrieving one or more attributes associated with the given user from the current instance;
      verifying that a setting for each of the retrieved attributes is valid for the request made by the given user; and
      responsive to successful verification, performing one or more operations associated with the database based on the request, wherein the database is based on a data structure, and wherein the step of performing further includes:
        if the request is associated with a read operation, obtaining one or more transaction identifiers (TTxID, ETxID) related to the request, each obtained transaction identifier pertaining to a transaction, whereby the data for said transaction is associated with the data structure; and
        accessing the data relating to the obtained transaction identifier (TTxID, ETxID) from the data structure;
      if the request is associated with a write or modify or delete operation, then in addition to the step of obtaining, the method further includes generating one or more transactions for spending or processing the transaction(s) associated with the obtained one or more transaction identifiers (TTxID, ETxID) based on the operation; and
      updating the data structure with identifiers relating to the generated transactions;

one or more registers for storing a plurality of transaction identifiers associated with the database; and a UTXO set or a memory for storing a copy of a plurality of UTXOs associated with the database.

11. The system comprising:

one or more computing devices as claimed in claim 9, each being a client entity;

a DBMS; and a communication network for communicatively coupling each client entity with the DBMS.

* * * * *